(12) United States Patent
Kneckt et al.

(10) Patent No.: US 11,363,635 B2
(45) Date of Patent: Jun. 14, 2022

(54) APPARATUS AND METHOD FOR EXTREMELY HIGH THROUGHPUT (EHT) MEDIUM RESERVATION

(71) Applicant: Apple Inc., Cupertino, CA (US)

(72) Inventors: Jarkko L. Kneckt, Los Gatos, CA (US); Jinjing Jiang, San Jose, CA (US); Lochan Verma, San Diego, CA (US); Qi Wang, Sunnyvale, CA (US); Su Khiong Yong, Palo Alto, CA (US); Tianyu Wu, Cupertino, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/161,264

(22) Filed: Jan. 28, 2021

(65) Prior Publication Data

US 2021/0345403 A1 Nov. 4, 2021

Related U.S. Application Data

(60) Provisional application No. 63/018,348, filed on Apr. 30, 2020.

(51) Int. Cl.
*H04W 74/08* (2009.01)
*H04W 8/24* (2009.01)
(Continued)

(52) U.S. Cl.
CPC ....... *H04W 74/0816* (2013.01); *H04L 1/1621* (2013.01); *H04W 8/24* (2013.01); *H04W 74/008* (2013.01)

(58) Field of Classification Search
CPC ............. H04W 74/002; H04W 74/008; H04W 74/0816; H04W 8/24; H04L 1/1621
See application file for complete search history.

(56) References Cited

U.S. PATENT DOCUMENTS 10,154,520 B1 * 12/2018 Hedayat ............ H04W 74/0833
10,159,093 B2 12/2018 Zhou et al.
(Continued)

FOREIGN PATENT DOCUMENTS

| GB | 2538099 A | 11/2016 |
|---|---|---|
| IN | 201847029140 A | 8/2018 |
| WO | WO2018/034458 A1 | 2/2018 |

OTHER PUBLICATIONS

Combined Search and Examination Report Under Sections 17 and 18(3) directed to related British Patent Application No. GB2106134.6, dated Sep. 17, 2021; 6 pages.
(Continued)

*Primary Examiner* — Liton Miah
(74) *Attorney, Agent, or Firm* — Sterne, Kessler, Goldstein & Fox P.L.L.C.

(57) ABSTRACT

Some embodiments include an apparatus, method, and computer program product for Extremely High Throughput (EHT) medium reservation. Some embodiments include a first station configured to exchange EHT-Request to Send (RTS) and/or EHT-Clear to Send (CTS) capabilities with a second station, and determine CTS response mode (e.g., rules) for the first station based at least on the RTS and CTS capabilities of the first and the second stations. Some embodiments include transmitting RTS frames and receiving CTS frames in the presence of punctured channels, implementing a flexible channel reservation scheme, reserving punctured bandwidths, and receiving CTS frames even when a primary channel is busy. Some embodiments include an RTS or an CTS frame that includes an EHT bandwidth puncture (BnP) signaling address and/or a modified scrambler seed that enable channel reservations for an EHT bandwidth.

20 Claims, 23 Drawing Sheets

(51) Int. Cl.
*H04W 74/00* (2009.01)
*H04L 1/16* (2006.01)

(56) References Cited

U.S. PATENT DOCUMENTS

| | | | | |
|---|---|---|---|---|
| 2011/0249659 | A1* | 10/2011 | Fontaine | H04L 1/1607 |
| | | | | 370/338 |
| 2013/0294394 | A1* | 11/2013 | Kneckt | H04W 72/04 |
| | | | | 370/329 |
| 2016/0150552 | A1* | 5/2016 | Sadiq | H04W 52/0225 |
| | | | | 370/329 |
| 2016/0381646 | A1* | 12/2016 | Li | H04W 52/36 |
| | | | | 370/338 |
| 2017/0041798 | A1* | 2/2017 | Li | H04W 74/0816 |
| 2017/0071014 | A1 | 3/2017 | Seok | |
| 2017/0257888 | A1* | 9/2017 | Kneckt | H04W 74/0816 |
| 2019/0349930 | A1 | 11/2019 | Chu et al. | |
| 2020/0015219 | A1* | 1/2020 | Asterjadhi | H04W 72/048 |
| 2020/0120544 | A1* | 4/2020 | Liu | H04W 24/10 |
| 2021/0204322 | A1* | 7/2021 | Lou | H04W 74/0816 |

OTHER PUBLICATIONS

Examination Report directed to related Indian Patent Application No. 202114019374, dated Feb. 14, 2022; 6 pages.

\* cited by examiner

1185

| Bits 3-6 value | BW | P20 | S20 | S40-1 | S40-2 | S80-1 | S80-2 | S80-3 | S80-4 | S160-1 | S160-2 | S160-3 | S160-4 | S160-5 | S160-6 | S160-7 | S160-8 |
|---|---|---|---|---|---|---|---|---|---|---|---|---|---|---|---|---|---|
| 0 | 20 | ▨ | | | | | | | | | | | | | | | |
| 1 | 40 | ▨ | ▨ | | | | | | | | | | | | | | |
| 2 | 80 | ▨ | ▨ | ▨ | | | | | | | | | | | | | |
| 3 | 80 | ▨ | ▨ | ▨ | ▨ | | | | | | | | | | | | |
| 4 | 80 | ▨ | ▨ | ▨ | ▨ | | | | | | | | | | | | |
| 5 | 80 | ▨ | ▨ | ▨ | ▨ | | | | | | | | | | | | |
| 6 | 160 | ▨ | ▨ | ▨ | ▨ | ▨ | ▨ | ▨ | ▨ | | | | | | | | |
| 7 | 160 | ▨ | ▨ | ▨ | ▨ | ▨ | ▨ | ▨ | ▨ | | | | | | | | |
| 8 | 160 | ▨ | ▨ | ▨ | ▨ | ▨ | ▨ | ▨ | ▨ | | | | | | | | |
| 9 | 160 | ▨ | ▨ | ▨ | ▨ | ▨ | ▨ | ▨ | ▨ | | | | | | | | |
| 10 | 320 | ▨ | ▨ | ▨ | ▨ | ▨ | ▨ | ▨ | ▨ | ▨ | ▨ | ▨ | ▨ | ▨ | ▨ | ▨ | ▨ |
| 11 | 320 | ▨ | ▨ | ▨ | ▨ | ▨ | ▨ | ▨ | ▨ | ▨ | ▨ | ▨ | ▨ | ▨ | ▨ | ▨ | ▨ |
| 12 | 320 | ▨ | ▨ | ▨ | ▨ | ▨ | ▨ | ▨ | ▨ | ▨ | ▨ | ▨ | ▨ | ▨ | ▨ | ▨ | ▨ |
| 13 | 320 | | | | | | | | | ▨ | ▨ | ▨ | ▨ | ▨ | ▨ | ▨ | ▨ |
| 14 | Reserved | | | | | | | | | | | | | | | | |
| 15 | Reserved | | | | | | | | | | | | | | | | |

FIG. 11C

| BW | P20 | S20 | S40-1 | S40-2 | S80-1 | S80-2 | S80-3 | S80-4 | S160-1 | S160-2 | S160-3 | S160-4 | S160-5 | S160-6 | S160-7 | S160-8 | # of Cases |
|---|---|---|---|---|---|---|---|---|---|---|---|---|---|---|---|---|---|
| 20 | No Puncture | | | | | | | | | | | | | | | | 1 |
| 40 | No Puncture | | | | | | | | | | | | | | | | 1 |
| 80 | No Puncture | P | P | P | | | | | | | | | | | | | 4 |
| 160 | No Puncture | P | P | P | P | P | P | P | | | | | | | | | 11 |
| 240 | No Puncture | | P | P | P | P | P | P | P | P | | | | | | | 8 |
| 320 | Puncture | | P | P | P | P | P | P | P | P | P | P | | | | | 11 |
| 240 (extra) | | | P | P | P | P | P | P | | | | | P | P | | | 6 |
| 320 (extra) | | | P | P | P | P | P | P | | | | | | | P | | 6 |

| Bit 3 | Bit 5 | Bit 6 | BW |
|---|---|---|---|
| 0 | 0 | 0 | 20 |
| 0 | 0 | 1 | 40 |
| 0 | 1 | 0 | 80 |
| 0 | 1 | 1 | 160/80+80 |
| 1 | 0 | 0 | 320 |
| 1 | 0 | 1 | 320 |
| 1 | 1 | 0 | 240 |
| 1 | 1 | 1 | 240 |

FIG. 11E

APPARATUS AND METHOD FOR EXTREMELY HIGH THROUGHPUT (EHT) MEDIUM RESERVATION

CROSS-REFERENCE TO RELATED APPLICATIONS

This application claims benefit of U.S. Application No. 63/018,348, filed on Apr. 30, 2020, entitled, Apparatus and Method for Extremely High Throughput (EHT) Medium Reservation, which is incorporated herein by reference in its entirety.

BACKGROUND

Field

The described embodiments relate generally to wireless communications, including reserving a wireless medium for transmission.

Related Art

Wireless stations and access points (APs) use Request to Send (RTS) and Clear to Send (CTS) frames to reserve a medium for transmission of data. RTS and CTS frames must be transmitted on a primary channel of a basic service set (BSS). For example, a preamble corresponding to an RTS frame transmitted on the primary channel identifies the bandwidth in which RTS frames are to be transmitted, and preamble puncturing is not permitted. Further, CTS frames are transmitted only if all channels from which the RTS signals are received are available. And, CTS frames are transmitted only if the primary channel is available.

SUMMARY

Some embodiments include a Request to Send (RTS) and Clear to Send (CTS) mechanism that enables a station and/or an access point (AP) to reserve a medium for transporting data utilizing extremely high throughput (EHT) protocol. Some embodiments enable the transmission and reception of preamble punctured RTS and CTS frames, flexible EHT bandwidth (BW) channel reservation, reserving punctured BWs, and CTS transmission even when the primary channel is busy. Some embodiments include RTS and CTS frames that enable communication of EHT BW channel reservations.

Some embodiments include an apparatus, method, and computer program product for EHT medium reservation. Some embodiments include an RTS station that includes a processor and a transceiver coupled to the processor. The processor can transmit RTS and CTS capabilities of the first electronic device (e.g., a station or an AP.) The processor can receive RTS and CTS capabilities of a second electronic device (e.g., an access point (AP) or another station), and configure a CTS response mode for the first electronic device based at least on the RTS and CTS capabilities of the first and the second electronic devices. The processor can obtain a transmit opportunity (TXOP) on a primary channel, and perform clear channel assessment (CCA) on the primary channel. The CCA is measured over a Point Coordination Function (PCF) Interframe Space (PIFS) using a 20 MHz CCA threshold, and/or perform CCA across an EHT BW over the PIFS using an EHT BW CCA threshold, where the EHT BW comprises a multiple of 80 MHz channels, and where the EHT BW CCA threshold is different than the 20 MHz CCA threshold. The processor can determine based at least on the performing that the primary channel is idle and/or that the EHT BW is idle.

Based on the determination, the processor can select the idle 20 MHz channels within the EHT BW for transmitting corresponding RTS frames, (e.g., select the secondary channel for transmitting a first RTS frame and/or select the primary channel for transmitting a second RTS frame.) The processor can transmit to the second electronic device, a first RTS frame on a secondary channel, where the first RTS frame indicates EHT BW channel reservations include a punctured channel according to the CTS response mode. A punctured channel is a channel that is within the EHT transmission BW, but does not carry any transmission, i.e. the punctured channel is not in use. For example, a channel may already be in use by a different service, or is not available, and that channel can be punctured (e.g., transmission does not include any power, filled with zeros or not used) to avoid interfering with the different service. The EHT BW can include one or more punctured channels. The processor can receive from the second electronic device, a first CTS frame on the secondary channel, where the secondary channel is included in the EHT BW channel reservations. In response to receiving the first CTS frame, the processor can transmit first data to the second electronic device on the secondary channel, and transmit to the second electronic device, a second RTS frame on the primary channel, where the first and second RTS frames are substantially the same.

Even when a CTS frame is not received in response to the second RTS frame on the primary channel, the processor can transmit second data to a third electronic device (e.g., different than the second electronic device) on the primary channel. The processor can maintain a network allocation vector (NAV) based on the first or second RTS frame transmitted on the primary channel, and receive a block acknowledgement (BA) corresponding to the second data within a duration of the NAV.

In some embodiments, an RTS station can employ dual RTS frame transmissions to different stations, and in response to the various CTS frames, transmit a signal that is received by different stations corresponding to respective CTS frames received. In some embodiments, the processor can transmit to a third electronic device, a first set of RTS frames on idle channels of the EHT BW channel reservations. Subsequent to transmitting the first set of RTS frames, the processor can receive from the third electronic device, a first set of CTS frames that correspond to a first subset of channels of the EHT BW channel reservations. The processor can transmit to the second electronic device, a second set of RTS frames on idle channels of the EHT BW channel reservations, and/or transmit to the second electronic device, a second RTS frame on a primary channel (e.g., the second set of RTS frames can include the second RTS frame.) Subsequent to transmitting the second set of RTS frames and/or the second RTS frame, the processor can receive from the second electronic device, a second set of CTS frames that correspond to a second subset of channels of the BW channel reservations, and transmit a combined EHT BW comprising first data on a portion of the first subset of channels and second data on a portion of the second subset of channels. The processor can maintain a NAV for the channels corresponding to the first data and the second data based at least on the first set of RTS frames transmitted.

Some embodiments include a CTS station that includes a processor and a transceiver coupled to the processor. The processor can receive RTS and CTS capabilities of a second electronic device (e.g., a station), and transmit RTS and CTS capabilities of the first electronic device (e.g., another station or an access point (AP).) The processor can configure CTS response mode for the first electronic device based at least on the RTS and CTS capabilities of the first and the second electronic devices, and receive from the second electronic device, a first RTS frame on a secondary channel, where the first RTS frame indicates EHT BW channel reservations including a punctured channel. The processor can receive from the second electronic device, a second RTS frame on a primary channel, where the first and second RTS frames are substantially the same, and/or receive from the second electronic device, multiple RTS frames across an EHT BW comprising a multiple of 80 MHz channels. The processor can perform clear channel assessment (CCA) on the primary channel over a Short Interframe Space (SIFS) using a 20 MHz CCA threshold and/or perform CCA across the EHT BW over the SIFS using an EHT BW CCA threshold, where the EHT BW CCA threshold is different than the 20 MHz CCA threshold. The processor can determine based at least on the performing, that i) the primary channel is busy, (so an CTS frame is not transmitted on the primary channel) and/or ii) that the EHT BW is idle. Based on the determinations, the processor can select corresponding idle 20 MHz channels within the EHT BW according to the CTS response mode, for transmitting corresponding CTS frames.

The processor can transmit to the second electronic device, a first CTS frame on the secondary channel, where the secondary channel is based at least on the EHT BW channel reservations and the CTS response mode. In response to transmitting the first CTS frame, the processor can receive first data from the second electronic device on the secondary channel, maintain a network allocation vector (NAV) based on the first RTS frame received on the secondary channel, and transmit a block acknowledgement (BA) corresponding to the first data within a duration of the NAV. In some embodiments, the first CTS frame includes: a receiver address (RA) that includes a first bit map of the EHT BW channel reservations over which the first RTS frame and other RTS frames are received, a second bit map of channels over which the first CTS frame and other CTS frames are transmitted, or CTS information. The CTS information can include: a network allocation vector (NAV) report on reserved channels of the first bit map, an estimation of signal-to-noise-plus-interference ratio (SINR) of the reserved channels of the first bit map, link adaptation guidance, or a recommendation on the reserved channels of the first bit map that can used for transmission.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 11C illustrates an example of signaling combinations corresponding to RTS and CTS frames for EHT medium reservation, according to some embodiments of the disclosure.

FIG. 11D illustrates an example of puncturing configurations corresponding to RTS and CTS frames, according to some embodiments of the disclosure.

FIG. 11E illustrates an example of bit values corresponding to RTS and CTS frames for EHT medium reservation, according to some embodiments of the disclosure.

Figure 1A:
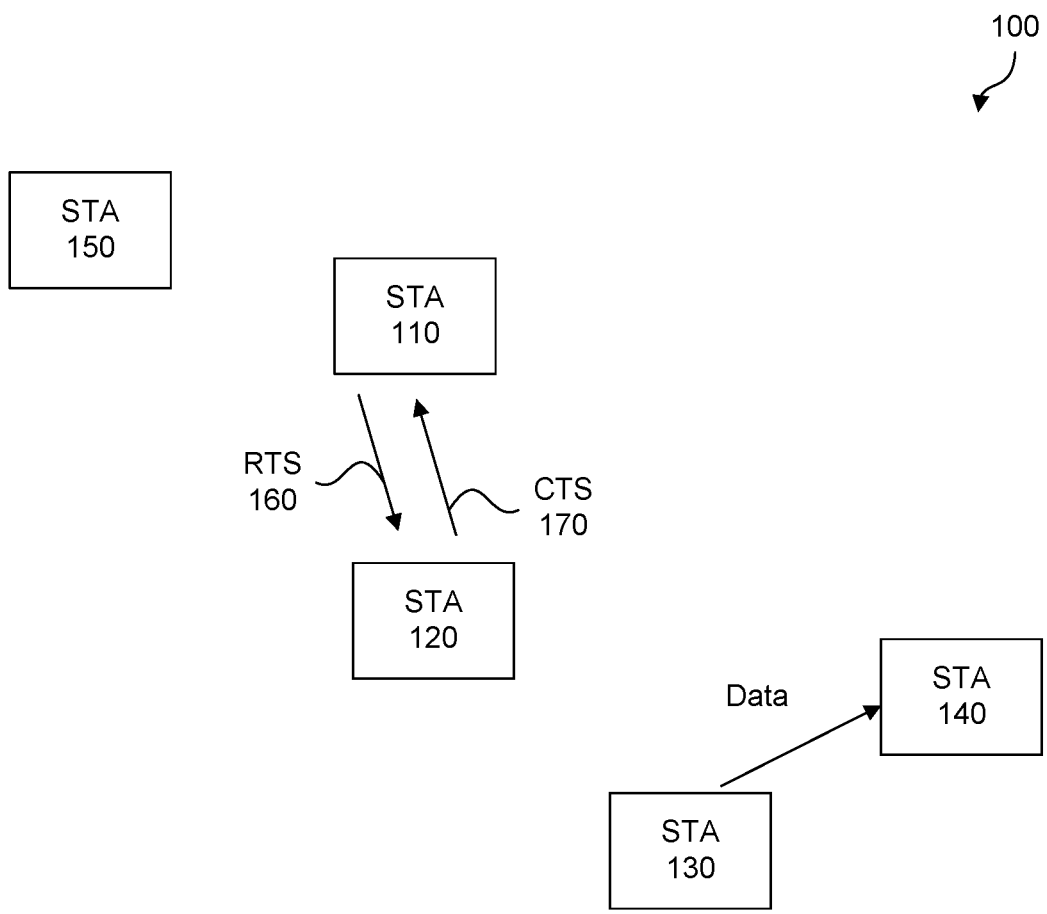
FIG. 1A illustrates an example system implementing for extremely high throughput (EHT) medium reservation, in according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include apparatus, method, and computer program products that enable stations and/or access points (APs) to reserve a medium using extremely high throughput (EHT) protocol. For example, some embodiments enable an EHT transceiver to: receive two or more resource units (RUs) on two or more channels concurrently; support a preamble punctured non-High Throughput (HT) duplicate physical protocol data unit (PPDU) so that not all 20 MHz channels within a PPDU bandwidth (BW) are utilized. A PPDU BW that includes multiples of 80 MHz bands can be called an EHT BW. Some embodiments enable Clear Channel Assessment (CCA) sensing per 20 MHz BW to determine whether each channel is busy or idle. Some embodiments enable: flexible BW reservation schemes that maximize the reserved bandwidth even if some channels are busy; allow Clear to Send (CTS) transmissions even when a CTS station determines that the primary channel is busy; allows a Request to Send (RTS) transmitter to control when a CTS frame is transmitted as a response to an RTS frame; enable CTS frames to transmit additional information for an RTS station; and enable RTS and CTS signaling to support 320 MHz BW and new IEEE 802.11be transmission BW combinations.

FIG. 1A illustrates an example system 100 implementing for extremely high throughput (EHT) medium reservation, in according to some embodiments of the disclosure. System 100 includes five stations: 110, 120, 130, 140, and 150. RTS and CTS signaling are used to reserve a medium for transmission. A station (e.g., station 120) can be an access point (AP). Station 110 senses idle channels before transmitting one or more RTS frames to station 120. Station 120 senses channels in which the RTS was transmitted and transmits one or more CTS frames on idle channels to station 110. In the examples that follow, RTS stations refer to stations that transmit RTS frames and receive CTS frames. And, CTS stations refer to stations or APs that transmit CTS frames and receive RTS frames.

Figure 16:
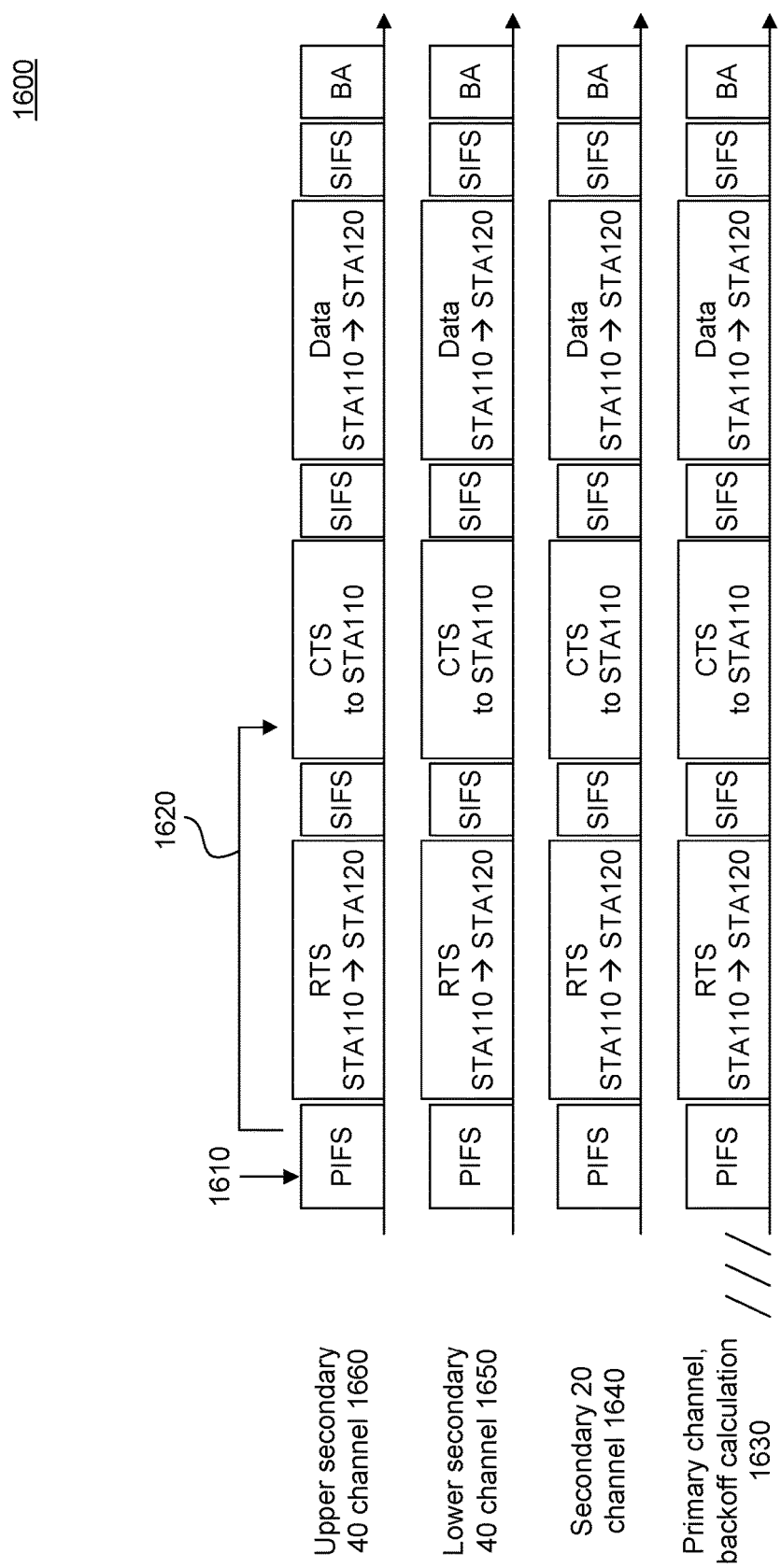
FIG. 16. illustrates an example system for medium reservation, according to some embodiments of the disclosure.

FIG. 16 illustrates an example system 1600 for medium reservation, according to some embodiments of the disclosure. As a convenience and not a limitation, system 1600 can be described using elements of FIG. 1A. System 1600 shows four 20 MHz channels: primary channel 1630, secondary 20 channel 1640, lower secondary 40 channel 1650, and upper secondary 40 channel 1660. These channels can be combined for a transmission BW from station 110, an RTS station, to station 120, a CTS station, at 20 MHz, 40 MHz, or 80 MHz for example. Other combinations up to 160 MHz are also possible.

There are limitations to system 1600 that some embodiments in the disclosure overcome. For example, RTS and CTS stations rely on CCA Energy Detection (ED) over the same Point Coordination Function (PCF) Interframe Space (PIFS) to determine whether an RTS frame or a CTS frame is transmitted. The CCA ED measurements are based on a total transmission BW. Primary channel 1640 must be available for RTS and corresponding CTS frame transmission, and preamble puncturing is not permitted (e.g., punctured channels are unused 20 MHz channels within a transmission BW (e.g., EHT BW, PPDU BW) are not allowed. Thus, all channels in the transmission BW need to be idle, otherwise CTS frames are not transmitted.)

At 1610, RTS station (e.g., station 110) senses channels over a PIFS to determine whether the channels are idle before transmitting an RTS signal to a CTS station (e.g., station 120.) Further, the CCA ED is sensed for the entire transmission BW using a single transmission BW threshold value. For example, if the transmission BW is 80 MHz (e.g., four 20 MHz channels), the CCA ED is based on the total 80 MHz bandwidth based on a single threshold value. In this example, RTS station has determined a transmission BW of 80 MHz, primary channel 1630 is available, there are no punctured channels (e.g., no 20 MHz channels that are not in use; in other words, all of the channels need to be available), and the CCA ED over the entire transmission BW of 80 MHz satisfied the single transmission BW threshold value. Thus, RTS frames are transmitted on each of the idle 20 MHz channels.

At 1620, CTS station (e.g., station 120) senses using CCA ED over the entire transmission BW during the same PIFS to determine whether a CTS frame is later transmitted on all of the channels that make up the transmission BW or only the primary channel. In addition, CTS frames are only transmitted if primary channel 1630 is available. Further, punctured channels are not allowed. If secondary 20 channel 1640 is busy, station 110 can only use primary channel 1630. CTS frames are transmitted only if all the channels in which an RTS frame was transmitted are available and reserved. In this example, the CCA ED over the same PIFS indicates that the single transmission BW threshold value for the entire 80 MHz transmission bandwidth is satisfied, primary channel 1630 is available, and there are no punctured channels. Thus, the CTS station transmits CTS frames on channels over which an RTS frame was receive. After receiving the CTS frames, station 110 then transmits data in corresponding channels to station 120. Station 120 subsequently transmits block acknowledgements (BAs) to station 110.

Figure 1B:
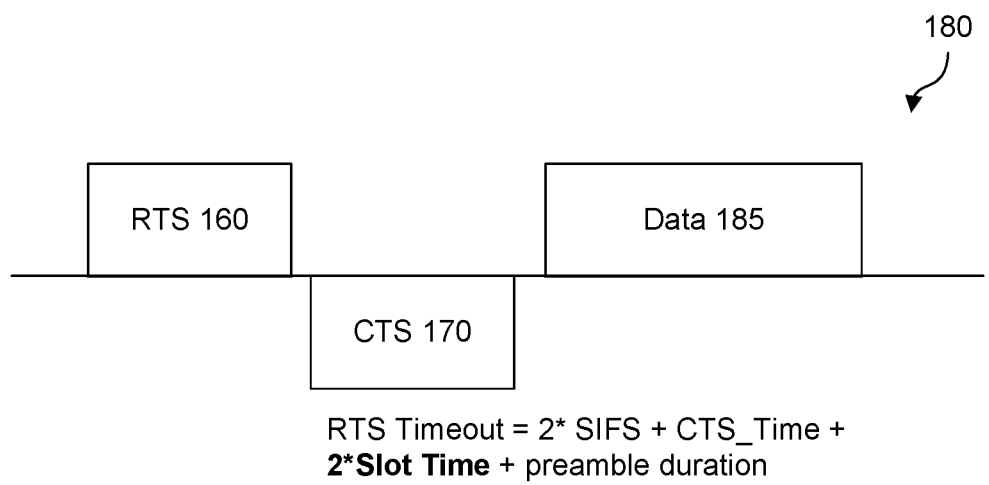
FIG. 1B illustrates an example of Request to Send (RTS) Timeout for EHT medium reservation, in according to some embodiments of the disclosure.

FIG. 1B illustrates an example 180 of an RTS Timeout for EHT medium reservation, in according to some embodiments of the disclosure. As a convenience and not a limitation, example 180 can be described using elements of FIG. 1A. For example, any devices in system 100 of FIG. 1A that received an RTS frame (e.g., station 150) can reset a Network Allocation Vector (NAV) reservation if they do not receive a preamble within an RTS Timeout value. Example 180 illustrates an RTS Timeout that equals 2*SIFS+CTS frame+2*slot+preamble duration. The RTS Timeout allows RTS station 110 to start data transmission before other stations can obtain a TXOP. The ability to reset NAV enables station 150 to obtain TXOP on channels without being blocked by a failed CTS frame reception. For example, station 150 may consider a channel idle and initiate TXOP obtaining after the NAV reset.

Figure 2:
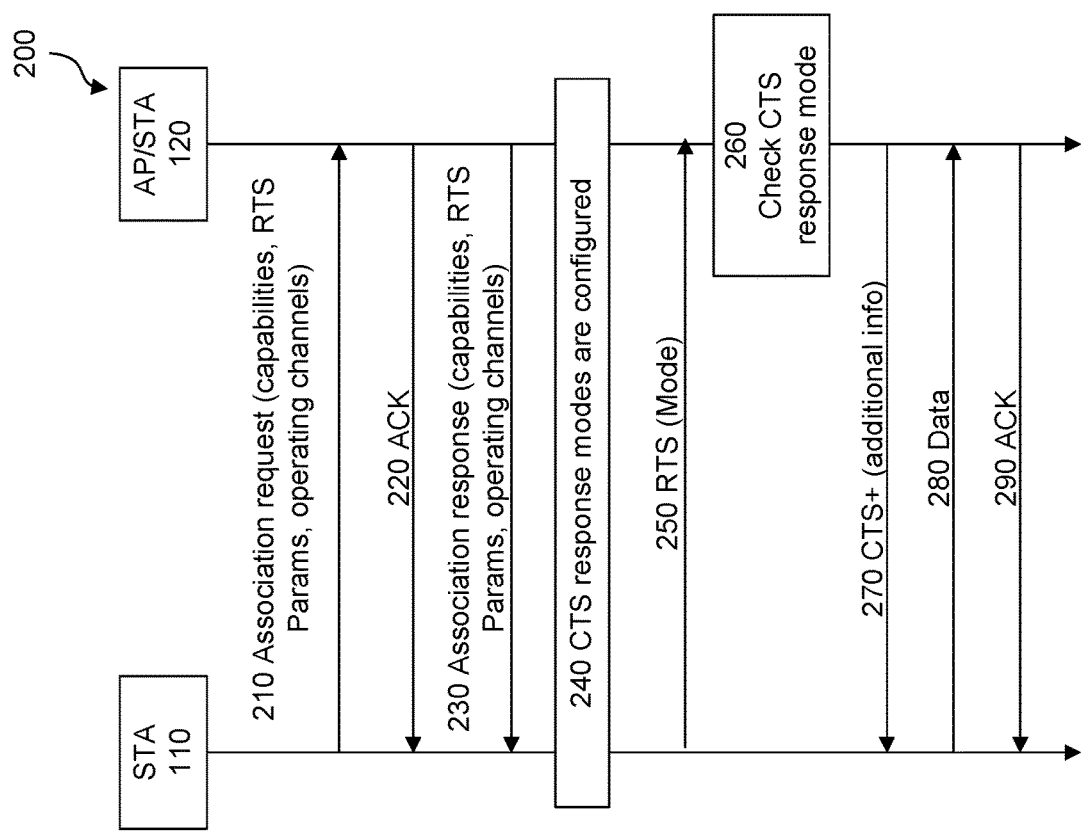
FIG. 2 illustrates configuring an example wireless system for EHT medium reservation, according to some embodiments of the disclosure.

FIG. 2 illustrates configuring an example wireless system 200 for EHT medium reservation, according to some embodiments of the disclosure. As a convenience and not a limitation, system 200 may be described with elements of FIG. 1A. In some embodiments system 200 addresses the limitations of system 1600. System 200 includes station 110 and station 120 that can be an AP, for example. A station (e.g., station 110 that can be an AP) can propose CTS response modes that determine how a CTS station (e.g., station 120 that can be an AP) that receives an RTS frame responds with a CTS frame. In response, the CTS station may accept, reject, and/or propose alternative parameters for the proposed CTS response modes as described below. In subsequent examples, for convenience and not a limitation, an RTS station is identified as RTS station 110 and a CTS station is identified as CTS station 120. Similarly, devices can agree on RTS transmission modes, (e.g., there may be separate configuration values for RTS transmission and CTS transmission.)

High Efficiency (HE) WLAN can include a Trigger frame type called a Multi User (MU)-RTS frame. The MU-RTS frame can be used to solicit a CTS frame from one or more STAs and allocate STAs to transmit CTS frames on different BWs. For example, RTS station 110 can transmit an MU-RTS frame that is received (e.g., specified by RTS station 110) by CTS stations 120 and 150. CTS stations 120 and 150 can respond accordingly. This is different than the EHT RTS frames that only transmit to a individual CTS station 120 or 150 at a time.

Traditionally, an AP transmits Trigger frames and STAs respond to the Trigger frames. In some embodiments, the STAs (e.g., RTS station 110) can send an MU-RTS type of Trigger frame and solicit a CTS frame from the AP (e.g., CTS station 120) and optionally from other STAs (e.g., CTS station 150) to which the STA (e.g., RTS station 110) may send data. In some embodiments, in infrastructure BSSs, the AP can send Trigger frames, or there may be an optional capability for some STAs to send an MU-RTS frame and for some APs to be able to receive the MU-RTS frame. In situations where, the AP is not capable to receive a MU-RTS frame, the STA can use RTS CTS signaling to reserve UL TXOPs.

At 210, RTS station 110 transmits a signal to CTS station 120 that includes the RTS and CTS capabilities of station 110. The transmission may be in an association request message or in a separate management frame. Some examples of RTS and CTS capabilities include but are not limited to the following:

The channels in which a station is capable of transmitting and receiving data. For example, the station can indicate the channels in which the station is capable of transmitting and/or receiving an RTS frame or a CTS frame. A non-high-throughput (HT) Duplicate PPDU CTS frame can be transmitted to at least one of these channels (e.g., when the channel is idle.)

An RTS and/or CTS station can include multiple radios (e.g., a radio in 2.4 GHz band and another in the 5 GHz band), and each radio may be capable of receiving in a different number of channels or resource units (RUs.) A station can indicate the number of channels or RUs that each radio is capable of receiving.

An RTS station can configure a channel to be an idle/low interference channel as a channel in which the station (e.g., RTS station 110) can receive a CTS frame. This ensures that the channel is mostly available for CTS transmissions. The interference level assessment may be based on measurements done during the CCA. If the RTS station is capable of assessing the interference level of the channel, the RTS station may use this channel. In another embodiment, the station may configure a primary channel of an other BSS (overlapping BSS that operates on the same area) to be the channel in which the station can receive the CTS frame. The use of other BSS's primary channel as the channel in which the STA is capable to receive the CTS frame ensures that the NAV information is received by the STAs of the overlapping BSSs, so that the STAs will set NAV for the duration of the RTS CTS protected transmissions.

A minimum set of reserved channels: The least number of the channels of that are reserved for an RTS station to receive CTS frames. This can include the primary channel.

A number of puncturing holes in the reserved channels (e.g., there are 20 MHz channels that are punctured (e.g., not used) within the EHT BW reserved channels because they may already in use by other services. RTS and CTS frames can be sent in the remaining available 20 MHz channels within the EHT BW reserved channels): For instance, a STA may operate with one, two or three puncturing holes within the reserved channels. The maximum size and the minimum size of the puncturing holes may be configured.

Contents of additional information in a CTS frame. For instance, the RTS station may request a network allocation vector (NAV) report on the reserved channels, an estimation of the signal-to-noise-plus-interference ratio (SINR) of the reserved channels, link adaptation guidance, and/or a recommendation on the reserved channels that can used for transmission (e.g., based on measurements that the CTS station determines.)

TXOP Reservation signaling may be configured to allow MU-RTS or RTS frame transmissions or only RTS frame transmissions. For instance, the STA (e.g., RTS station 110) may request an AP (e.g., CTS station 120) use MU-RTS signaling. In some embodiments, if the STA (e.g., RTS station 110) desires to transmit to other P2P STAs in proximity and allocate TXOPs to transmit to multiple STAs (e.g., CTS stations 120 and 150) via MU-RTS signaling.

The TXOP reservation signaling configuration may be direction dependent, e.g., the initiation may be configured to an UL or a DL direction, or to both directions. In some embodiments, the STA (e.g., station 110) may configure an AP (e.g., station 120) to initiate DL TXOPs that transmit to the STA with reservation signaling (e.g., transmit MU-RTS or RTS signals). This may be used if the STA has difficulties being available all the time due to multi-link operation or transmissions in peer-to-peer connections. In some embodiments, the AP (e.g., station 120) may configure the STA (e.g., station 110) to use TXOP reservation signaling to UL TXOPs if the AP has difficulties being available during STA transmissions, or if the link to the STA is poor (e.g., poor quality.)

In some embodiments, the TXOP reservation signaling (e.g., RTS, CTS signaling) is needed if the reservation BW is larger than a threshold BW, or if the transmission BW includes specific channel(s). This configuration ensures hidden terminal protection for the specific channels.

At 220, CTS station 120 transmits an ACK.

At 230, CTS station 120 transmits the RTS and CTS capabilities of CTS station 120 to RTS station 110. Examples of RTS and CTS capabilities are described above at 210.

At 240, RTS station 110 and CTS station 120 configure their respective CTS response modes according to the RTS and CTS capabilities described at 210. For example, the RTS station 110 can indicate the minimum EHT BW to be reserved to the CTS station 120, and indicate on which channels CTS frames can be received. CTS station 120 checks if it can satisfy the minimum EHT BW requested, and transmits CTS frames on the channels that the RST station 110 indicated.

At 250, RTS station 110 transmits one or more RTS frames to CTS station 120. The CTS mode response as well as the reserved channels can be conveyed via one or more of the following: i) a preamble (e.g., scramble seed bits) corresponding to an RTS frame; ii) a Frame Control Field of the RTS frame; and/or iii) an address field in the RTS frame. These are described in FIGS. 9-11 below.

At 260, CTS station 120 determines based on the configured CTS response mode, how to transmit one or more CTS frames and whether any additional information as requested.

At 270, CTS station 120 transmits the one or more CTS frames to RTS station 110 with corresponding contents of additional information in the one or more CTS frames.

At 280, RTS station 110 receives the CTS frames including the corresponding contents of additional information and transmits data to CTS station 120 in corresponding channels.

At 290, CTS station 120 transmits and ACK (e.g., a block acknowledgement (BA)) to RTS station 110.

Figure 3:
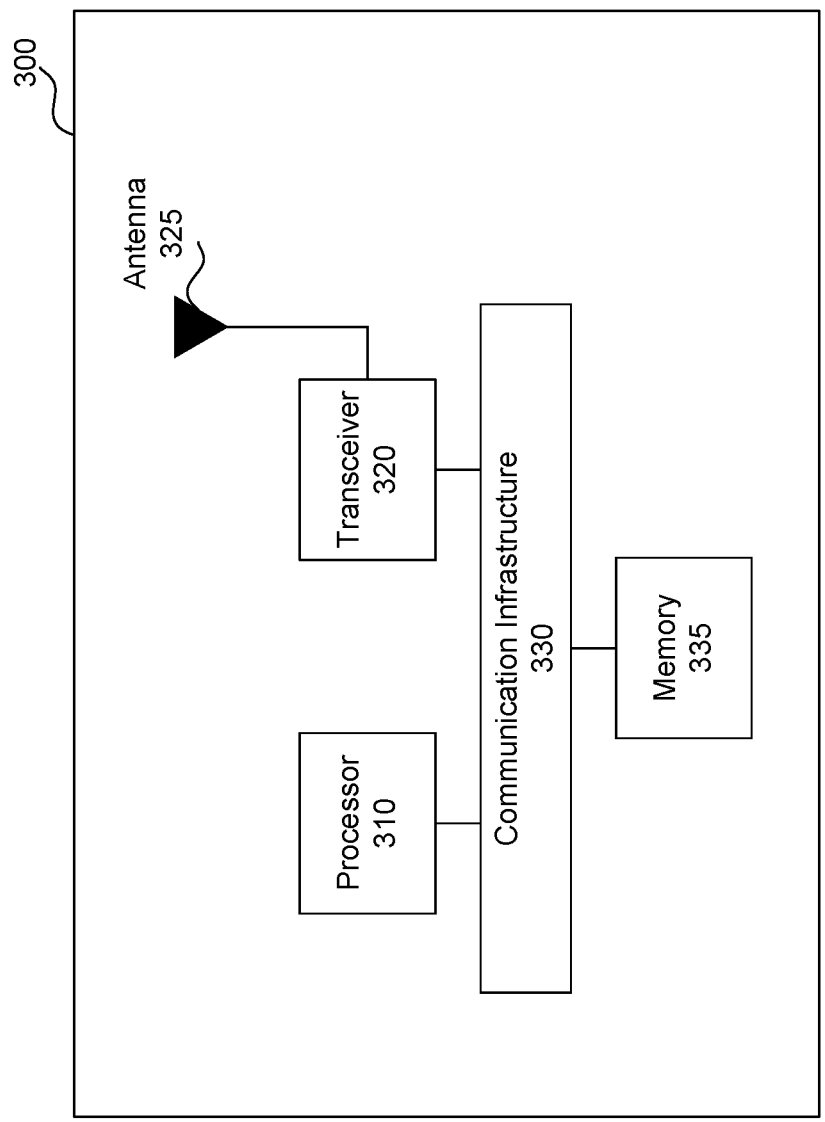
FIG. 3 illustrates a block diagram of an example wireless system with a transceiver for EHT medium reservation, according to some embodiments of the disclosure.

FIG. 3 illustrates a block diagram of an example wireless system 300 with a transceiver for EHT medium reservation, according to some embodiments of the disclosure. As a convenience and not a limitation, FIG. 3, may be described with elements of FIGS. 1A, 1B, and 2. System 300 may be any of the electronic devices (e.g., stations 110, 120, 130, 140, and/or station 150) of system 100. System 300 may include processor 310, transceiver 320, communication interface 325, communication infrastructure 330, memory 335, and antenna 325 that together perform operations enabling wireless communications including secure channel estimation. Transceiver 320 transmits and receives communications signals including RTS frames and/or CTS frames for EHT medium reservation, according to some embodiments, and may be coupled to antenna 325. Communication infrastructure 330 can be a bus. Memory 335 can include random access memory (RAM) and/or cache, and can include control logic (e.g., computer software) and/or data. Antenna 325 coupled to transceiver 320, may include one or more antennas that may be the same or different types. Accordingly, transceiver 320 can include one or more radios of same or different types. According to some embodiments, processor 310, alone or in combination with memory 335, and/or transceiver 320, implements the RTS/CTS frames and transmission rules for EHT medium reservation. For example, processor 310, alone or in combination with transceiver 320 and/or memory 335 can transmit RTS frames and/or CTS frames based on transmission rules discussed with respect to FIGS. 4, 5, 6A, 6B, 6C, and 7-14.

Figure 4:
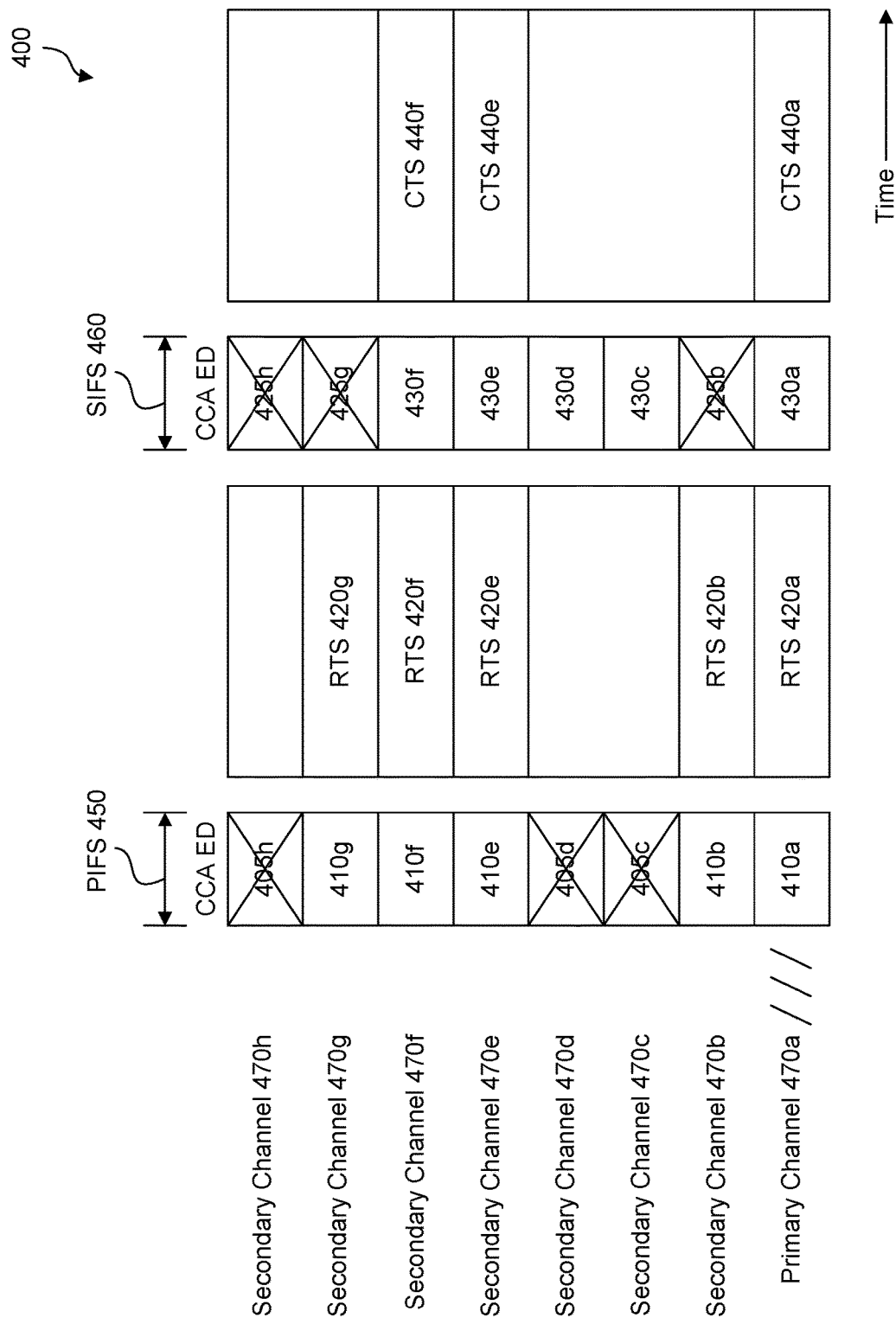
FIG. 4 illustrates an example of secondary channel allocations for EHT medium reservation, according to some embodiments of the disclosure.

FIG. 4 illustrates example 400 of secondary channel allocations for EHT medium reservation, according to some embodiments of the disclosure. As a convenience and not a limitation, FIG. 4, may be described with elements of FIGS. 1A, 1B, 2, and 3. In example 400, station 110 can be the RTS station and station 120 can be the CTS station. Example 400 illustrates that RTS station 110 receives an transmit opportunity (TXOP) on primary channel 470a (e.g., using Enhanced Distributed Channel Access (EDCA.) RTS station 110 can puncture one, two, or three holes in the EHT transmission BW, and each punctured hole may have a different size (e.g., 20 MHz, 40 MHz.) RTS station 110 determines the EHT BW based on the determined CTS response mode (as described in FIG. 2). For example, RTS station 110 can indicate to CTS station 120, a combination of the reserved channels that make up the EHT BW over which RTS station 110 transmits RTS frames, and over which CTS frames are expected to be received.

In some embodiments, an RTS station 110 can perform CCA ED over the secondary channels utilizing a 20 MHz CCA threshold values to determine whether individual secondary channels are idle or busy. This is in contrast to system 1600 of FIG. 16 in which an RTS station performed CCA ED over the entire transmission BW utilizing a single transmission BW threshold value. And system 1600 does not allow punctured holes. Just before transmitting RTS frames 420, RTS station 110 performs Signal Detection (SD) at the physical layer on the primary channel to synchronize with any Wireless Local Area Network (WLAN) preambles detected. RTS station 110 also performs CCA ED on each secondary 20 MHz channel to determine if they are idle or busy.

RTS station 110 performs CCA ED on the secondary channels 470b-470h over PIFS 450. Each secondary channel 470b-470h may be idle or busy. In example 400, CCA ED measurements 410b, 410e, 410f, and 410g compared to their respective channel threshold values indicate that their corresponding secondary channels 470b, 470e, 470f, and 470g are idle, while CCA measurements 405c, 405d, and 405h indicate that their corresponding secondary channels 470c, 470d, and 470h are busy. Accordingly, RTS station 110 transmits RTS frames 420a, 420b, 420e, 420f, and 420g to CTS station 120. An RTS frame 420 includes an indication of the combination of the reserved channels that make up the EHT BW. The reserved channels indicate the channels in which CTS frames are to be transmitted.

CTS station 120 can receive one or more RTS frames 420, and if the CTS station 120's address is the same as the Receiver Address (RA) included in an RTS frame 420, CTS station 120 may respond with a CTS frame. A CTS frame may be transmitted to channels in which an RTS frame 420 was received if CTS station 120 determines via CCA ED that the corresponding channel is idle. CTS station 120 uses the Transmitter Address (TA) that was included in the RTS frame 420 as the RA in the corresponding CTS frame.

In example 400, CTS station 120 determines that the RA in an RTS frame 420 is the CTS station 120's address, and CTS station 120 performs CCA ED on the corresponding secondary channels. For example, CTS station 120 can perform CCA ED on the secondary channels 470b-470h over a Short Interframe Space (SIFS) 460 using a CCA threshold corresponding to a 20 MHz channel. This is different than the CTS station of system 1600 that utilized the same PIFS as the RTS station. And, the CCA threshold in example 400 corresponds to 20 MHz channels rather than the entire transmission BW threshold of system 1600. In some embodiments, CTS station 120 can perform CCA ED on the secondary channels 470b-470h over the same PIFS as RTS station 110 but use a CCA threshold corresponding to each 20 MHz channel rather than the entire EHT BW.

In example 400, CTS station 120 determines that CCA ED measurements 430c, 430d, 430e, and 430f compared to their respective channel threshold values indicate that corresponding secondary channels 470c, 470d, 470e, and 470f are idle. CTS station 120 determines that a received RTS frame did not include secondary channels 470c or 470d as a reserved channel. Further, even though RTS frame 420g was received, CTS station 120's CCA ED measurements 425b, 425g, and 425h indicate that the corresponding secondary channels, 470b, 470g and 470h are busy. Accordingly, CTS station 120 transmits CTS frames 440e, 440f, along with CTS 440a via their respective channels to RTS station 110. This is different than system 1600 because CTS station 120 can transmit CTS frames on a subset of the reserved channels that were idle and thus available to CTS station 120.

RTS station 110 receives CTS frames 440a, 440e, and 440f, and subsequently sends data on the corresponding channels to CTS station 120.

Figure 5:
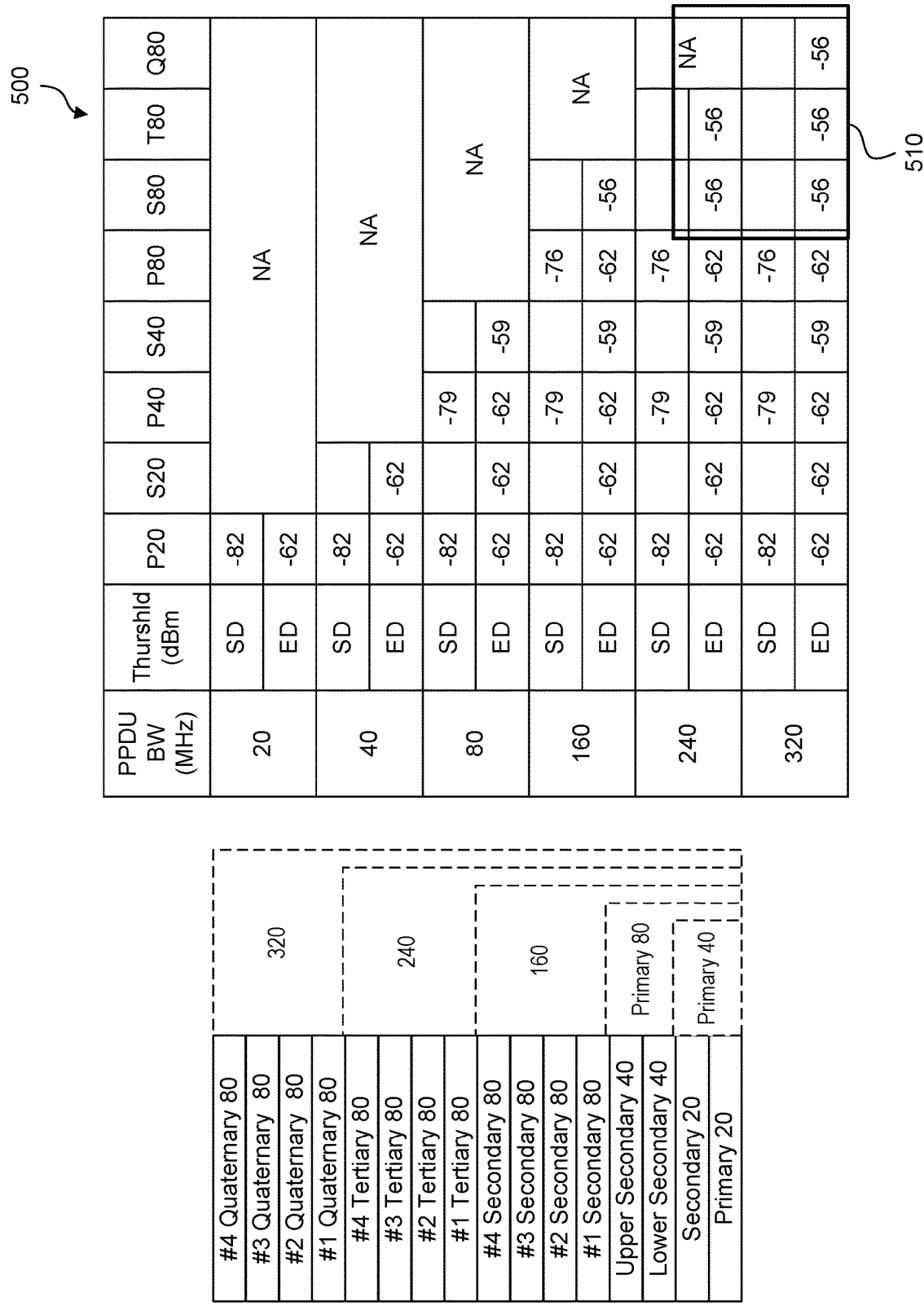
FIG. 5 illustrates an example of Clear Channel Assessment (CCA) thresholds for EHT bandwidths for EHT medium reservation, according to some embodiments of the disclosure.

FIG. 5 illustrates an example 500 Clear Channel Assessment (CCA) thresholds for EHT BWs for EHT medium reservation, according to some embodiments of the disclosure. As a convenience and not a limitation, FIG. 5, may be described with elements of FIGS. 1A, 1B, and 2-4. Example 500 identifies CCA ED threshold for use in EHT BWs. During SD, a receiver finds, locks onto, and begins decoding an IEEE 802.11-compatible signal. The SD can be a minimum sensitivity level. RTS station 110 and/or CTS station 120 can perform CCA ED per 20 MHz channel to sense whether a channel is idle or busy.

In some embodiments RTS station 110 and/or CTS station 120 can sense CCA ED for larger BWs and use the CCA thresholds listed in the table according to the BW. For example, EHT protocol (e.g., IEEE 802.be) transmissions use 80 MHz bands as a base for 160, 240, and 320 MHz transmissions. In an example, RTS station 110 and/or CTS station 120 can use the CCA thresholds 510 for larger EHT BWs and use CCA thresholds per 20 MHz. RTS station 110 and/or CTS station 120 can determine different idle channels based on the corresponding CCA ED measurements. A station may perform the per 20 MHz and larger BW CCA measurements at substantially the same time and combine the idle indications of both CCA estimations. The station may calculate multiple alternatives of idle channels configurations by using the CCA and select the mode that meets the configured RTS/CTS response criteria. Typically larger transmission bandwidths, few punctured holes are preferred in the idle transmission bandwidth selection.

Figure 6A:
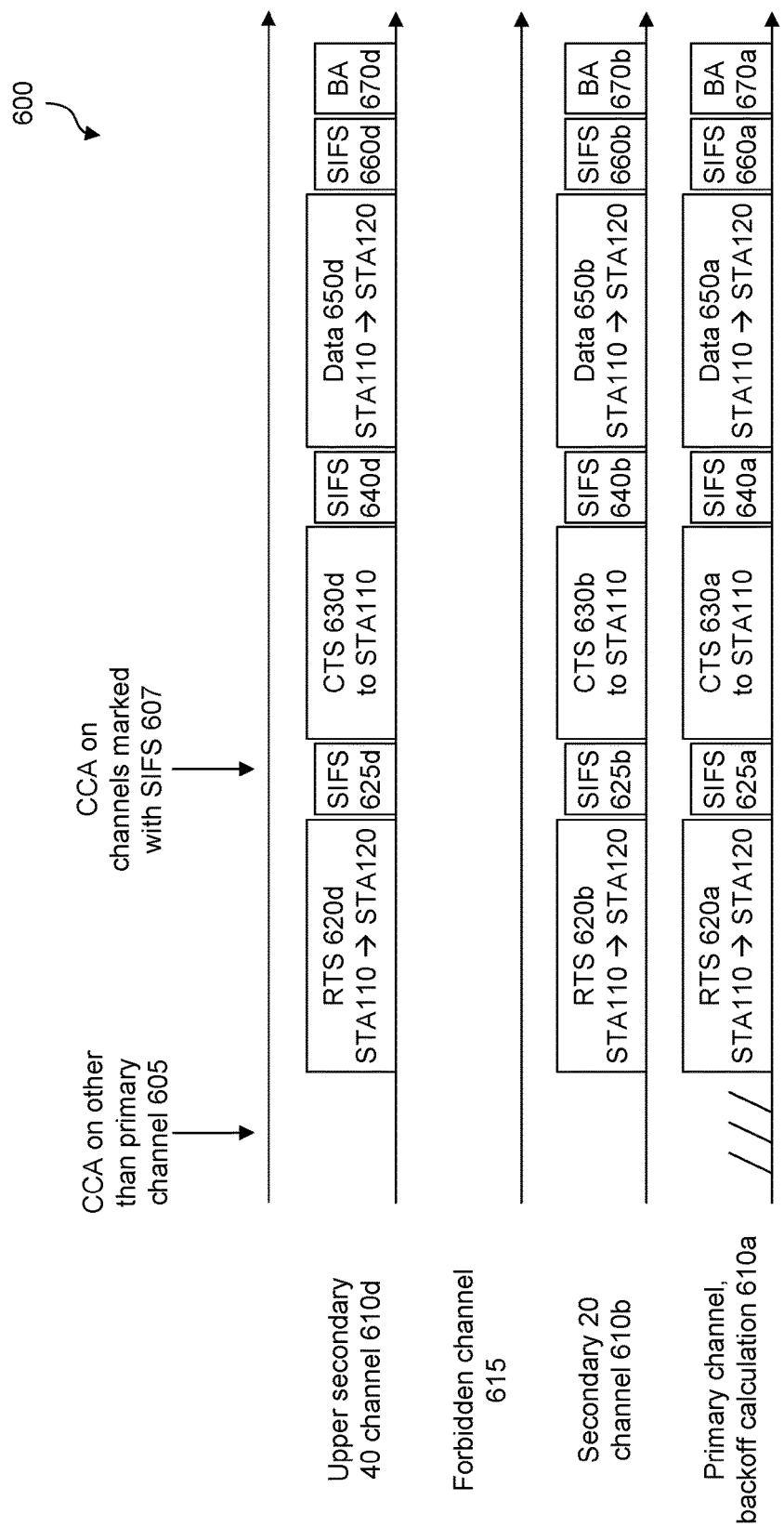
FIG. 6A illustrates an example of static puncture signaling for EHT medium reservation with forbidden channels, according to some embodiments of the disclosure.

FIG. 6A illustrates an example 600 of static puncture signaling for EHT medium reservation with forbidden channels, according to some embodiments of the disclosure. As a convenience and not a limitation, FIG. 6A, may be described with elements of FIGS. 1A, 1B, and 2-5. Example 600 illustrates how RTS and CTS frames can signal static puncturing in which a channel is forbidden. Examples of CTS response modes including transmitting the static puncturing using a preamble corresponding to an RTS frame and/or a CTS frame is in FIGS. 9-11 below. For example, an AP can signal which channels are forbidden channels within a basic service set (BSS.) RTS station 110 and/or CTS station 120 can convey the forbidden channels via a CTS response mode in a PHY preamble that is coupled to an RTS frame and/or a CTS frame.

In example 600, RTS station 110 transmits RTS frames to CTS station 120 (e.g., station 120 that can be an AP.) Example 600 includes primary channel 610a, secondary 20 channel 610b, forbidden channel 615, and upper secondary 40 channel 610d.

At 605 CCA ED is performed over a PIFS on the secondary channels that are not punctured, and SD is performed on primary channel 610a. In example 600, RTS frames 620a, 620b, and 620d are transmitted to CTS station 120 on corresponding channels, primary channel 610a, secondary 20 channel 610b, and upper secondary 40 channel 610d.

At 607, CTS station 120 performs CCA ED over a SIFS on the secondary channels that are not punctured, and SD is performed on primary channel 610a. Subsequently, CTS station 120 transmits CTS frames 630a, 630b, and 630d to RTS station 110. After another SIFS, RTS station 110 transmits data 650a, 650b, and 650d in channels that correspond to the received CTS frames. After another SIFS, CTS station 120 transmits block acknowledgements (BAs) 670a, 670b, and 670d to RTS station 110.

Figure 6B:
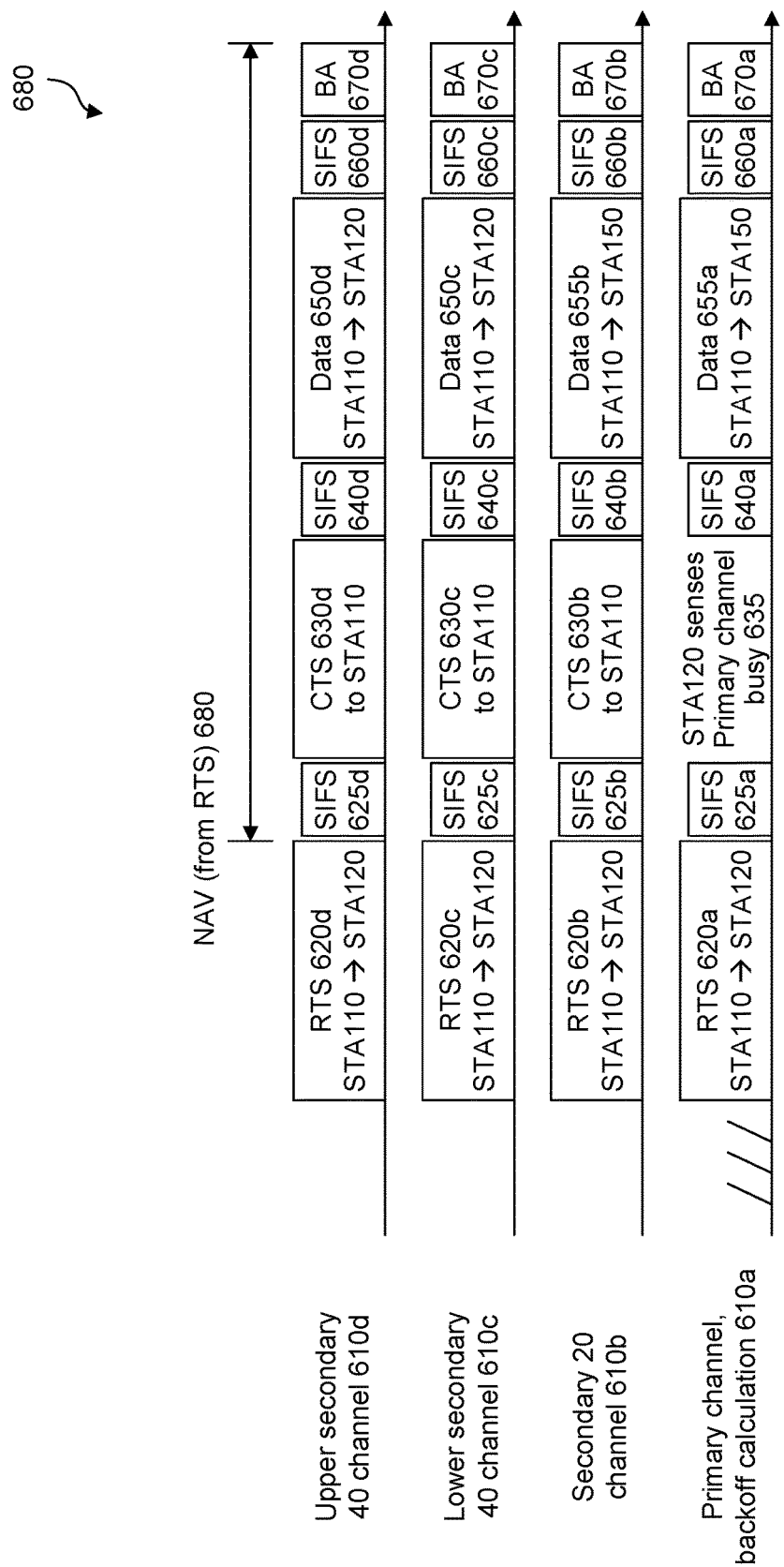
FIG. 6B illustrates an example of CTS signaling when a primary channel is busy for EHT medium reservation, according to some embodiments of the disclosure.

FIG. 6B illustrates an example 680 of CTS signaling when a primary channel is busy for EHT medium reservation, according to some embodiments of the disclosure. As a convenience and not a limitation, FIG. 6B, may be described with elements of FIGS. 1A, 1B, 2-5, and 6A. Example 680 is similar to example 600 of FIG. 6A but forbidden channel 615 is replaced with lower secondary 40 channel 610c. In example 680, RTS station 110 determines that lower secondary 40 channel 610c is idle over a PIFS and transmits RTS frame 620c to CTS station 120. CTS station 120 determines that lower secondary 40 channel 610c is idle over a SIFS and transmits CTS frame 630c to RTS station 110. Data 650c, SIFS 660c, and BA 670c follow in time as illustrated within a duration of NAV 680 that begins from RTS frame 620 transmission.

In example 680, CTS station 120 performs SD on primary channel 610a and determines that primary channel 610a is busy. Consequently, CTS station 120 does not transmit a CTS frame on primary channel 610a. CTS station 120 determines, however, that the secondary channels 610b, 610c, and 610d are idle, and transmits CTS frames 630b, 630c, and 630d to RTS station 110 in corresponding secondary channels, even when primary channel 610a is busy. Thus, example 680 is different than system 1600 of FIG. 16 in which a CTS frame is always transmitted in a primary channel.

Like example 600, example 680 includes RTS station 110 transmitting data 650c and 650d to CTS station 120. Unlike example 600, example 680 illustrates that RTS station 110 can transmit data 655a and 655b to a different station (e.g., station 150 of FIG. 1) on primary channel 610a and on secondary 20 channel 610b. Note that all of the transmissions including BA 670a-670d follow in time a within a duration of NAV 680 that begins from RTS 620 transmission. In some embodiments, CTS station 120 determines that lower secondary 40 channel 610c is busy and does not transmit CTS frame 630c. Consequently, RTS station 110 can choose to transmit data to other stations (e.g., station 130 of FIG. 1) which would replace data 650c (not shown).

Figure 6C:
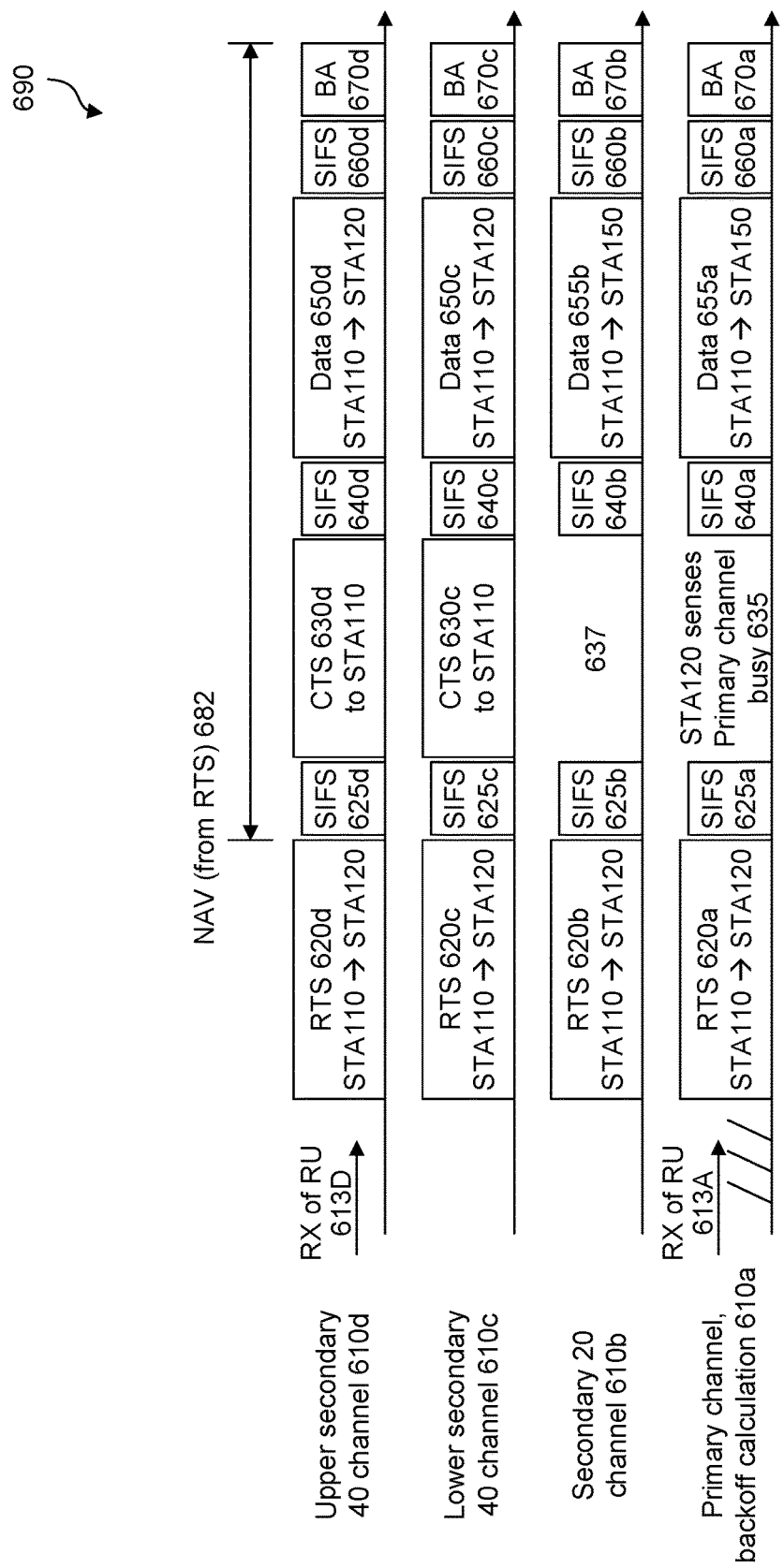
FIG. 6C illustrates an example of Resource Unit (RU) reception in multiple channels for EHT medium reservation, according to some embodiments of the disclosure.

FIG. 6C illustrates an example 690 of RU reception in multiple channels for EHT medium reservation, according to some embodiments of the disclosure. As a convenience and not a limitation, FIG. 6C, may be described with elements of FIGS. 1A, 1B, 2-5, 6A, and 6B.

RTS station 110 receives RUs (e.g., transmissions) on primary channel 610a. As described earlier, a station can include multiple radios (e.g., a radio in 2.4 GHz band and another in the 5 GHz band), and each radio may be capable of receiving a different number of RUs (e.g., transmissions). RTS station 110 can indicate in a preamble and/or in an RTS frame, the number of RUs that each radio is capable of receiving, and the channels in which RTS station 110 can receive CTS frames. The indications are described in FIGS. 9-11 below. For example, an RTS frame 620 (and/or a preamble corresponding to an RTS frame 620) can include RX of RU 613a and RX of RU 613d that indicate the number of RUs that RTS station 110 can receive on different radios (e.g., on different frequency bands) and the number can be the same or different on the different radios. As shown in FIG. 6C, CTS frame 630d transmitted in response to RX of RU 613d enables RTS station 110 to reserve RUs on upper secondary 40 channel 610d.

Rules for selecting the channel (e.g., upper secondary 40 channel 610d) in which RTS station 110 can receive RUs can include but are not limited to the following: i) a highest or smallest channel number of the largest secondary channel; ii) a channel of the largest secondary channel that is the closest to or furthest away from primary channel 610a; or iii) a channel that is X channels higher or lower from primary channel 610a. If the other channel does not fit within the PPDU, then the largest available channel can be used as the other channel in which RTS station 110 receives RUs.

Example 690 also illustrates dynamic puncturing 637 that replaces CTS frame 630b. In this puncturing mode, the CTS frame transmission may be configured to be transmitted in a mode, in which an other channel is considered as the primary channel. For instance, the other channel (e.g., upper secondary 40 channel 610d) is considered as a temporary primary channel, that defines the frequencies of the temporary secondary 20, secondary 40, secondary 80, tertiary 80, quaternary 80 MHz. Thus, the same channel usage rules as used for primary channel may be applied also in this case of a temporary primary channel. Similarly, the puncturing rules may be applied to these temporary channels.

Figure 7:
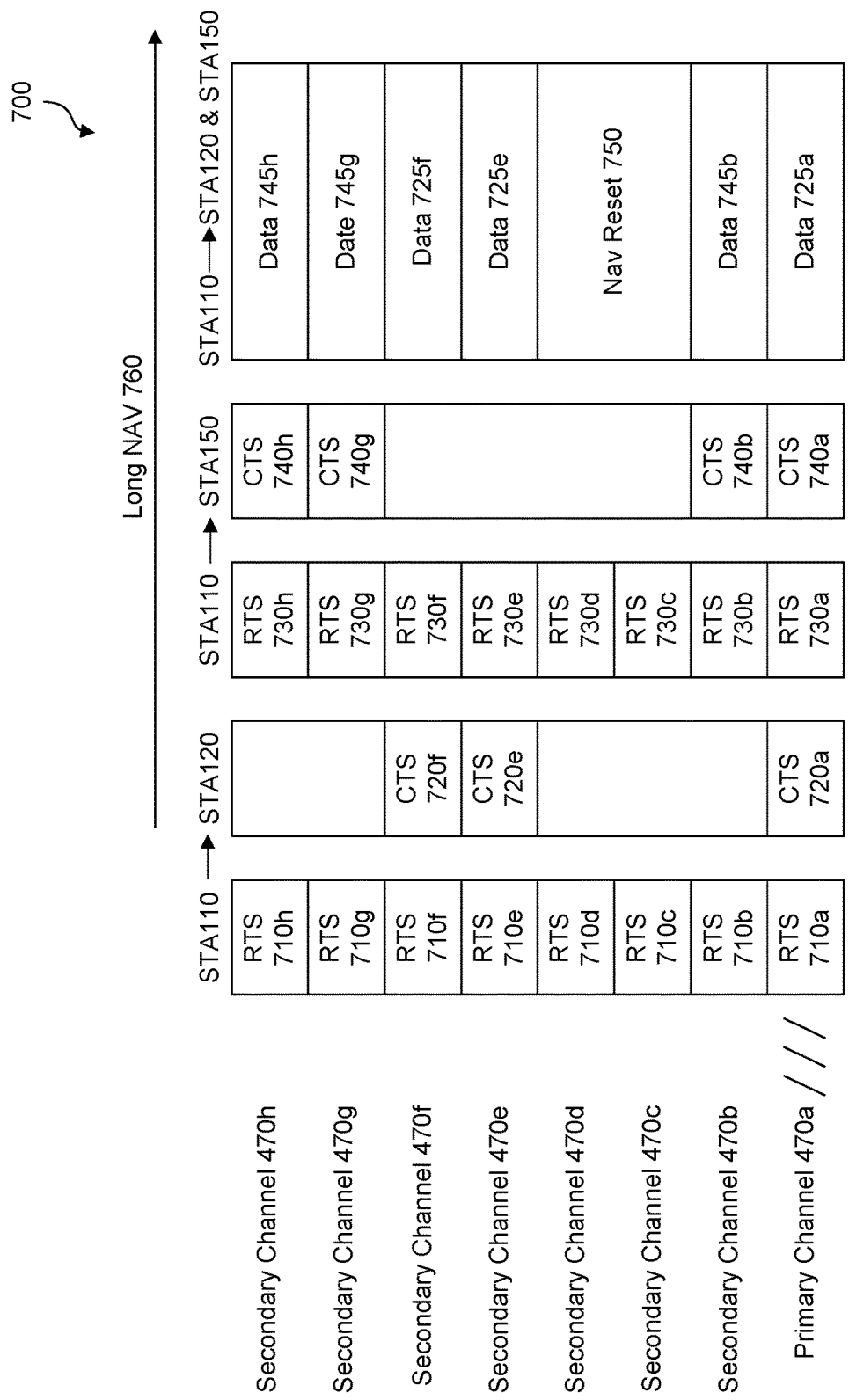
FIG. 7 illustrates an example of dual RTS and Clear to Send (CTS) reservation scheme for EHT medium reservation, according to some embodiments of the disclosure.

FIG. 7 illustrates example 700 of a dual RTS and CTS reservation scheme for EHT medium reservation, according to some embodiments of the disclosure. As a convenience and not a limitation, FIG. 7, may be described with elements of FIG. 1A, 1B, 2-5, 6A, 6B, or 6C. In example 700, RTS station 110 can transmit RTS frames on idle channels to two or more different stations (e.g., stations 120 and 150 which can be APs) to obtain enough channels to transmit data. Based on the CTS frames that RTS station 110 receives, RTS station 110 can send data in corresponding channels which may be via two or more different stations.

Example 700 includes the primary and secondary channels as described in example 400 of FIG. 4, where primary channel 470a can use EDCA to acquire TXOPs. In the example, RTS station 110, a TXOP holder, determines an EHT BW of 120 MHz to be reserved. RTS station 110 performs CCA over a PIFS and determines that channels 470a-470h are idle and transmits RTS frames 710a-710h that indicate the reserved channels making up the EHT BW, on the corresponding channels to CTS station 120. CTS station 120 determines over a SIFS that channels 470a, 470e, and 470f are idle and transmits CTS frames 720a, 720e, and 720f to RTS station 110 indicating that 60 MHz BW is available. RTS station 110 determines that 60 MHz are still needed, and RTS station 110 transmits RTS frames 730a-730h on idle channels to another CTS station 150 (which can be an AP.) CTS station 150 determines that channels 470a, 470b, 470g, and 470h are idle and transmits CTS frames 740a, 740b, 740g, and 740h to RTS station 110 indicating that 80 MHz BW is available. RTS station 110 determines which of the available 20 MHz channels are preferred. For example, RTS station 110 chooses between CTS station 120 or CTS station 150 on primary channel 470a. In this example, RTS station 110 chooses CTS station 120. Thus, RTS station 110 transmits in a single combined transmission, data 725a, 725e, and 725f to CTS station 120 and data 745b, 745g, and 745h to CTS station 150 on corresponding channels that total 120 MHz BW.

In example 700, long NAV 760 extends from the first RTS frames 710 until the acknowledgements (not shown) of data 725 and data 745 are received by RTS station 110. The second RTS frames 730 prevents other stations such as station 130 of FIG. 1 that received RTS frames 710 from cancelling long NAV 760. If CTS station 150 does not hear any transmission after the RTS frames 730 within an RTS Timeout (see FIG. 1B above), CTS station 150 can perform NAV Reset 750 on secondary channels 470c and 470d to try to obtain a TXOP. In other words, only the channels which are used by RTS station 110 are reserved. To summarize, the NAV reset rule is the same after both RTS frames, and the second RTS frame prevents NAV reset from the first RTS frame.

Figure 8:
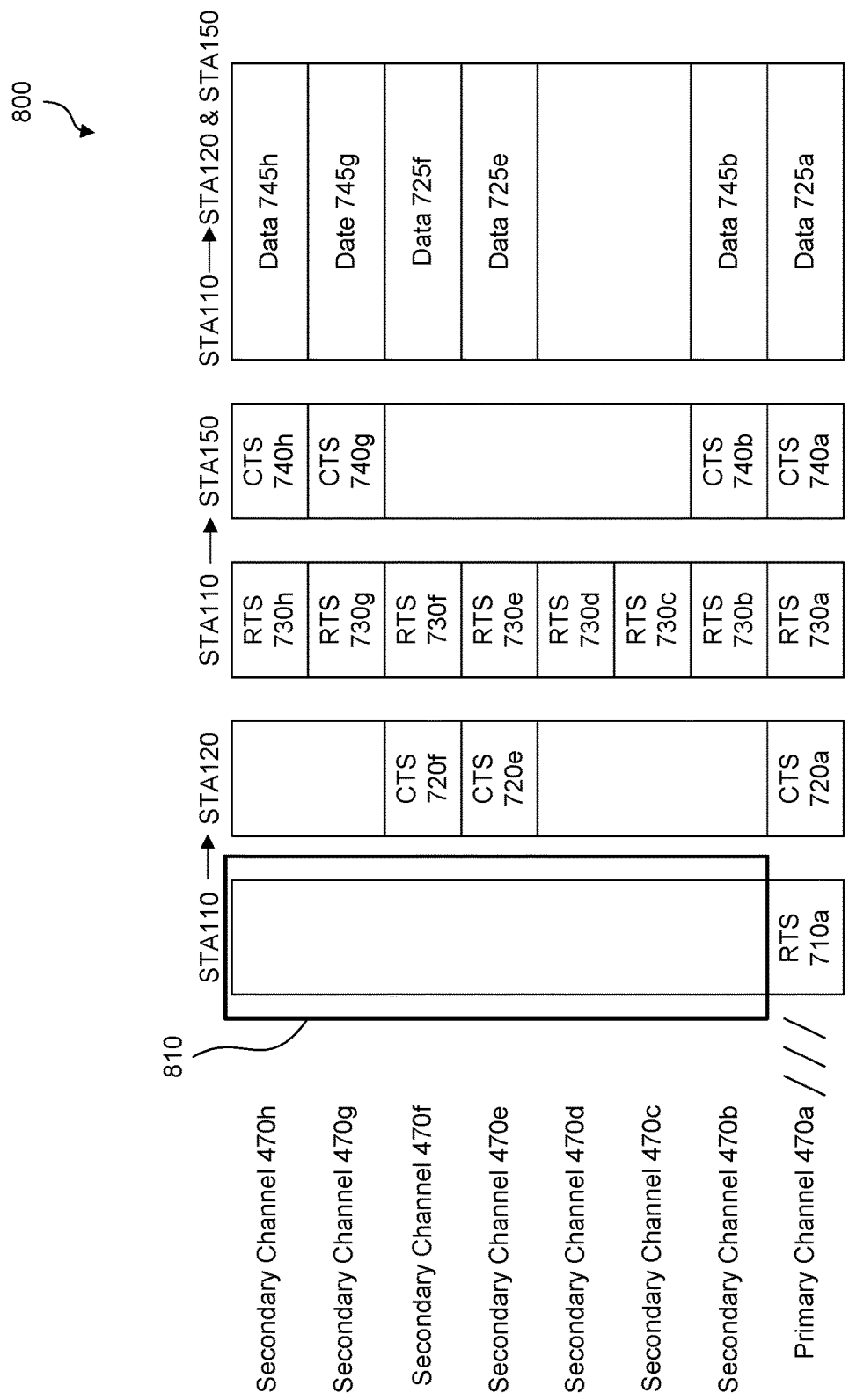
FIG. 8 illustrates another example of dual RTS and CTS reservation scheme for EHT medium reservation, according to some embodiments of the disclosure.

FIG. 8 illustrates another example 800 of a dual RTS and CTS reservation scheme for EHT medium reservation, according to some embodiments of the disclosure. As a convenience and not a limitation, FIG. 8, may be described with elements of FIG. 1A, 1B, 2-5, 6A, 6B, 6C, or 7. Like example 700, in example 800 RTS station 110, a TXOP holder, wants to transmit data that utilizes an EHT BW of 120 MHz. In example 800, however, RTS station 110 only transmits RTS frame 710a on primary channel to CTS station 120. CTS station 120 receives RTS frame 710a and determines over a SIFS that channels 470a, 470e, and 470f are idle and transmits CTS frames 720a, 720e, and 720f to RTS station 110 indicating that 60 MHz BW is available. RTS station 110 determines that 60 MHz are still needed, and RTS station 110 transmits RTS frames 730a-730h on idle channels to another CTS station 150 (which can be an AP.) CTS station 150 determines that channels 470a, 470b, 470g, and 470h are idle and transmits CTS frames 740a, 740b, 740g, and 740h to RTS station 110 indicating that 80 MHz BW is available. RTS station 110 determines which of the available 20 MHz channels are preferred. For example, RTS station 110 chooses between CTS station 120 or CTS station 150 on primary channel 470a. Accordingly, RTS station 110 transmits in a single combined transmission, data 725a, 725e, and 725f to CTS station 120 and data 745b, 745g, and 745h to CTS station 150 on corresponding channels that total 120 MHz BW.

In example 800, RTS STA 110 may send only RTS frame 710a, receive CTS frames 720a, 720e, 720f and transmit data on channels for which CTS is received (e.g., 725a, 725e, 725f.)

In example 800, CTS station 150 does not have to reset the NAV for the channels within 810 to which the RTS was not transmitted. Similarly as in the example 700, the NAV is reset on the channels after which no CTS frames 740c and 740d are transmitted or data 745c and 745d are received.

To support EHT medium reservation, some embodiments include modification of at least an address field of RTS and CTS frames or of scrambler seed bits as shown below in Table 1.

TABLE 1

RTS and CTS Formats for EHT Medium Reservation

| Frame | RTS | CTS |
|---|---|---|
| IEEE 802.ac version | 3 bits of scrambler seed and Transmitter Address (TA) group bit = 1 | Group bit in Receiver Address (RA) = 1 and 3 bits in scrambler seed |
| EHT address field embodiments (at least) | Modify Address fields to include new info (FIG. 9) | New CTS frame (FIG. 10) |

TABLE 1-continued

RTS and CTS Formats for EHT Medium Reservation

| Frame | RTS | CTS |
|---|---|---|
| EHT scrambler seed embodiments | Scrambler seed bits include additional info (FIGS. 11A, 11B) | Scrambler seed bits include additional info (FIGS. 11A, 11B) |

As described above in FIG. 1B, the RTS Timeout allows stations that detect the RTS frame to reset their NAVs if an RTS frame channel reservation is not successful. Some embodiments include an RTS frame with modified address fields that include EHT medium reservation information, and a CTS frame that includes new fields. Some embodiments include using scrambler seed bits to include EHT information in both RTS and CTS frames. These embodiments are described below in FIGS. 9-11.

Figure 9:
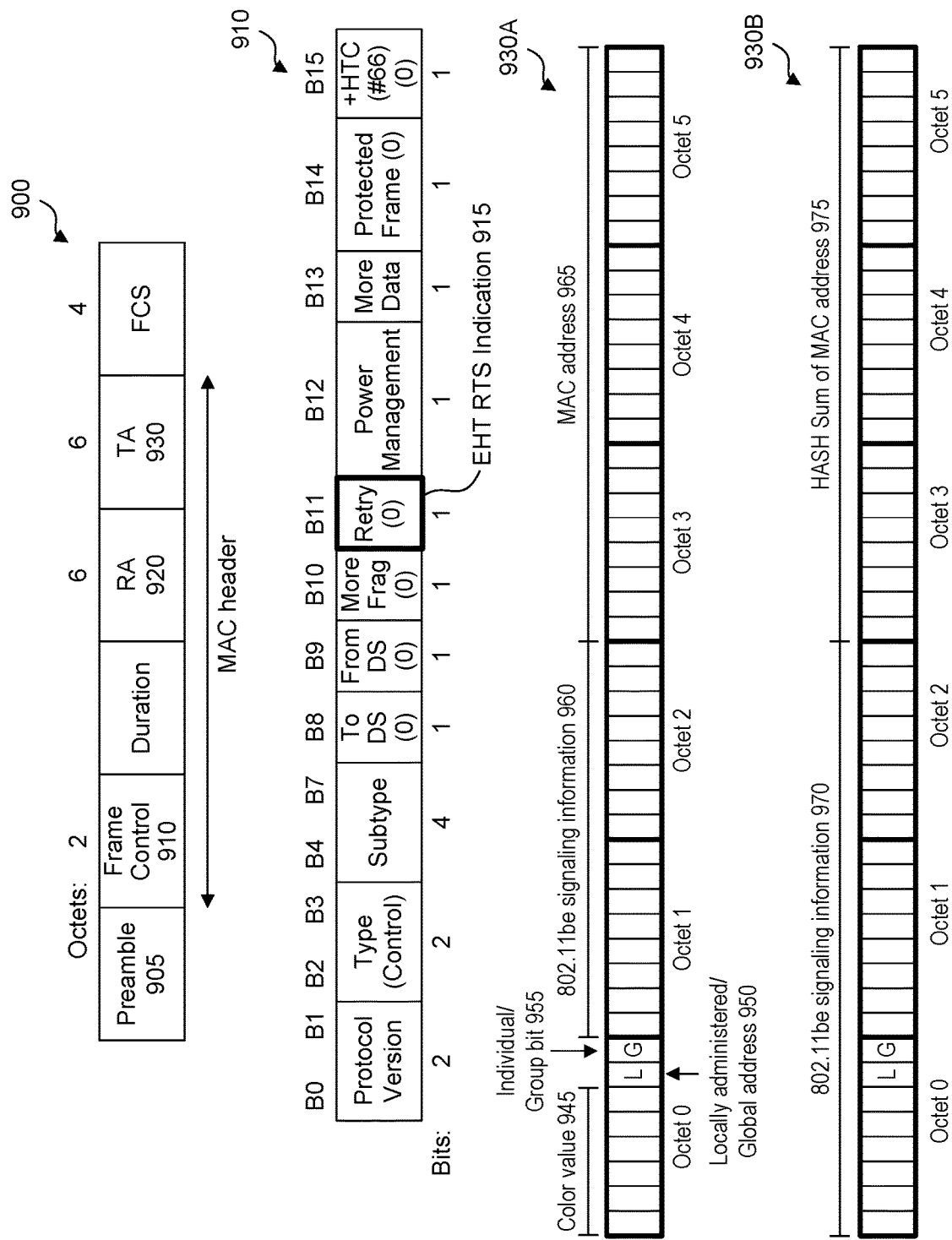
FIG. 9 illustrates an example of RTS frames for EHT medium reservation, according to some embodiments of the disclosure.

FIG. 9 illustrates RTS frames for EHT medium reservation, according to some embodiments of the disclosure. As a convenience and not a limitation, FIG. 9, may be described with elements of FIG. 1A, 1B, 2-5, 6A, 6B, 6C, 7, or 8. Example 900 illustrates an RTS frame format for EHT medium reservation that includes preamble 905, duration, frame control 910, Receiver Address (RA) 920, Transmitter Address (TA) 930, and a frame check sequence (FCS). While the format of example 900 is consistent with legacy RTS formats, the information within is different. For example, a bit, B11, within frame control 910 is used for EHT RTS indication 915, and TA 930 supports EHT medium reservation as described below.

EHT RTS indication 915 can be a bit within frame control 910 shown below. A single bit field within frame control 910 field can be set to '1' to indicate that the RTS frame supports EHT medium reservation. For example, an RTS station can transmit an RTS frame where bit 11, Retry bit, can be set to '1' to indicate to a CTS station that the RTS frame includes EHT medium reservation information. Other bits can be used.

FIG. 9 also includes TA 930, where TA 930 can be called an EHT BW and Puncture (BnP) Signaling Address. Two examples of TA 930 are described below: TA 930A and TA 930B. TA 930A includes color value 945, 802.11be signaling information 960 (e.g., EHT medium reservation signaling information), and MAC address 965. MAC address 965 includes the MAC address bits. Locally administered/global address 950 and individual/group bit 955 are reserved. Color value 945 includes 6 bits that have a unique value for the BSS. Color value 945 can be used to reduce the risk of colliding MAC addresses.

The reserved channels to which the RTS frame(s) are transmitted (and that make up the EHT BW) are identified as a bit map carried within 802.11be signaling information 960 which is 2 octets long. The lowest bit can indicate the lowest channel in which RTS station 110 operates. A value of '1' in a bit of the bit map indicates that an RTS frame was transmitted to the channel and a value of '0' indicates that an RTS frame was not transmitted to the channel. The bit map also indicates RU puncture information for EHT medium reservation-capable stations.

TA 930B includes 802.11be signaling information 970 and HASH sum of the MAC address 975. In TA930B, 802.11be signaling information 970 includes 3 octets: color value 945, locally administered/global address 950, and individual/group bit 955 as described above. Both TA 930A and 930B can be used in conjunction with 3 bits of the scrambler seed bit used for IEEE 802.ac as shown in Table 1 above. The scrambler seed bits are found in preamble 905 and the 3 bits used that correspond to an RTS channel reservation request are shown below in Table 2.

TABLE 2

Scrambler Seed Bits for RTS Channel Reservation Request

| Scrambler seed bits B4, B5, and B6 | Meaning |
|---|---|
| 0 | Reserve all channels, or no CTS; CTS frame(s) are transmitted only if they can be transmitted to all channels in which an RTS frame was transmitted |
| 1 | Primary and maximum reservation; indicates that a CTS frame is transmitted to a primary channel, or no CTS frame is transmitted, and CTS frame(s) are transmitted to channels that are idle |
| 2 | Maximum reservation; indicates that CTS frame(s) are transmitted to all channels that are idle |
| 3 | Primary and any reservation; indicates that a CTS frame is transmitted to a primary channel or no CTS frame is transmitted; and CTS frame(s) are transmitted to any idle |
| 4 | Any reservation |
| 5 | Configured mode 1 reservation |
| 6 | Configured mode 2 reservation |
| 7 | Configured mode 3 reservation |
| 8 | Configured mode 4 reservation |

TA 930 can be called an EHT BW and Puncture (BnP) Signaling Address, and Table 3 below indicates how APs and stations utilize the EHT BnP signaling address with EHT RTS indication 915. When an AP is a station, the AP's MAC address is always present. For example, when an AP is an RTS station and transmits an RTS frame to reserve an EHT medium, the Transmit Address (TA) field of the RTS frame includes the AP's MAC Address and the Receiver Address (RA) field of the RTS frame includes the EHT BnP signaling address (e.g., TA 930A or TA 930B) with EHT RTS indication (915). When the AP is a CTS station that receives an RTS frame requesting EHT medium reservation, the AP MAC Address is present in the RA field of the RTS frame and the TA field of the RTS frame includes the EHT BnP signaling address (e.g., TA 930A or TA 930B) with EHT RTS indication 915. When station 1 (e.g., RTS station 110) transmits an RTS frame requesting EHT medium reservation to station 2 (e.g., CTS station 120), the TA field includes TA 930A or TA 930B with EHT RTS indication 915.

TABLE 3

| EHT BW and Puncture (BnP) Signaling Address | | | | |
|---|---|---|---|---|
| | | RTS | | CTS |
| From | To | TA | RA | RA = TA in RTS |
| AP | STA | AP MAC Address | EHT BnP signaling address with EHT RTS indication | AP MAC Address |
| STA | AP | EHT BnP signaling address with EHT RTS indication | AP MAC Address | EHT BnP signaling address with EHT RTS indication |
| STA1 | STA2 | EHT BnP signaling address with EHT RTS indication | STA2 MAC Address | EHT BnP signaling address with EHT RTS indication |

Figure 10:
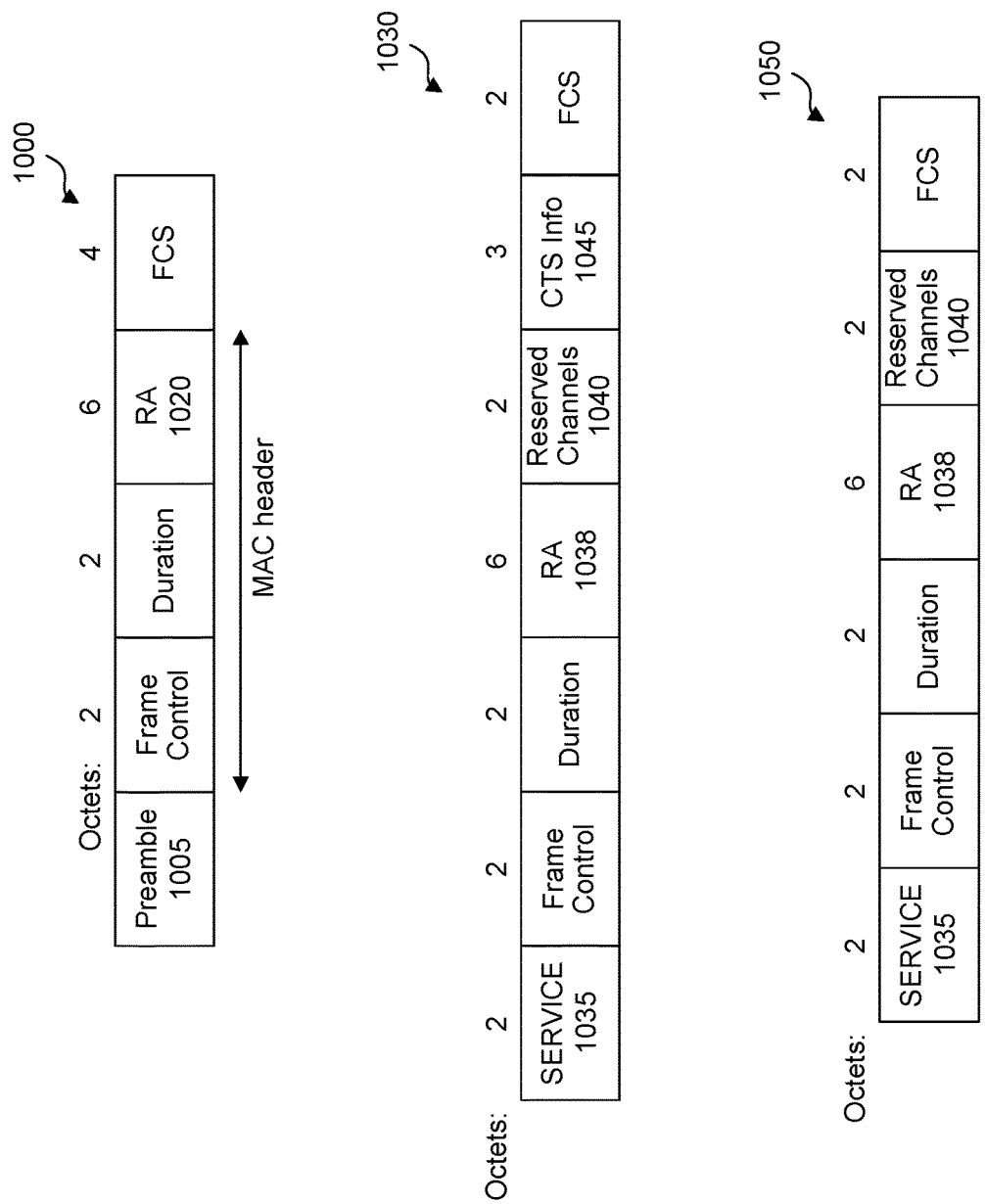
FIG. 10 illustrates an example of CTS frames for EHT medium reservation, according to some embodiments of the disclosure.

FIG. 10 illustrates CTS frames for EHT medium reservation, according to some embodiments of the disclosure. As a convenience and not a limitation, FIG. 10, may be described with elements of FIG. 1A, 1B, 2-5, 6A, 6B, 6C, 7, 8, or 9. Example 1000 illustrates a CTS frame for system 1600 of FIG. 16 that includes preamble 1005, frame control, duration, RA 1020, and FCS. CTS frames 1030 and 1050 illustrate CTS frames for EHT medium reservation that includes the information of example 1000, and additional fields. CTS frame 1050 includes frame control, duration, and FCS of example 1000. PPDU Preamble 1005 includes a Service 1035 field and scrambler seed 1100 of FIG. 11 below of example 1000. The preamble 905 is equal to the preamble 1005. Reserved channels 1040 is a bit map that indicates the channels on which CTS frame 1050 is duplicated and transmitted. RA 1038 is shown expanded at the bottom of FIG. 10, and is substantially the same as TA 930A or TA 930B of FIG. 9. When CTS station 120 receives an RTS frame that includes TA 930, CTS station 120 inserts TA 930 into RA 1038.

CTS frame 1030 includes CTS frame 1050 and the addition of CTS Info 1045. CTS Info 1045 can include but is not limited to the following: link adaptation recommendation, buffer status report/real time packet information, NAV information of busy channels, indications to RTS station 110 to reduce a transmission rate, and/or feedback to RTS station 110.

Table 3 above indicates how APs and stations utilize the EHT BnP signaling address (e.g., TA 930) with EHT RTS indication 915 for RA 1020. For example, RTS station 110 can identify the RTS station 110's EHT BnP signaling address in a received CTS frame 1030 or 1050 by checking Hash of MAC addresses 975. The duration of CTS frames 1030 or 1050 is included within the RTS Timeout as described in FIG. 1B above.

As mentioned above in Table 1, some embodiments described in FIGS. 9 and 10 above described EHT RTS indication 915, RTS TA 930 that is equal to CTS RA 1038, CTS reserved channels 1040, and CTS Info 1045.

Figure 11A:
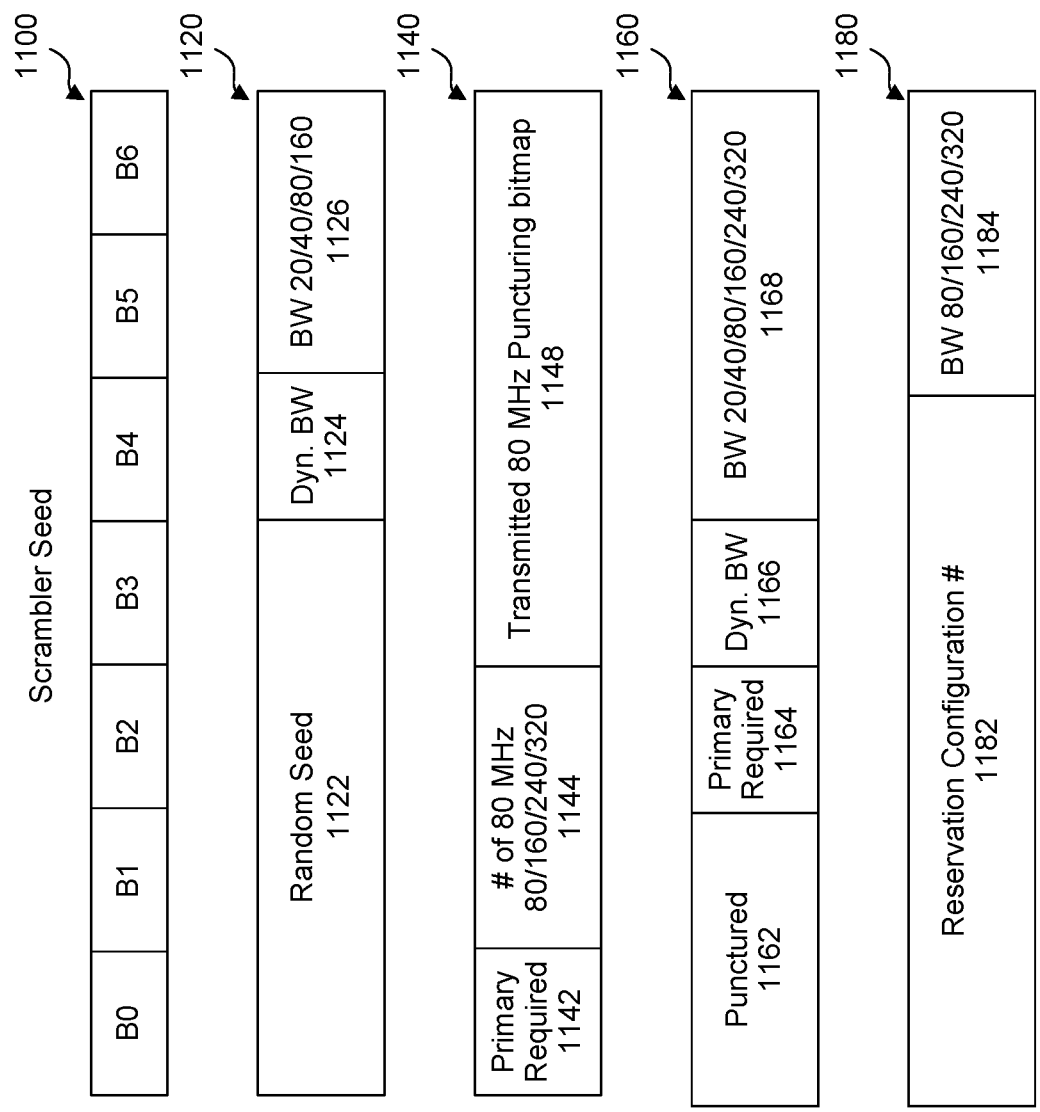
FIG. 11A illustrates examples of scrambler seed formats corresponding to RTS and CTS frames for EHT medium reservation, according to some embodiments of the disclosure.

FIG. 11A illustrates scrambler seed formats corresponding to RTS and CTS frames for EHT medium reservation, according to some embodiments of the disclosure. For example, FIG. 11A addresses scrambler seed formats that can be used in conjunction with EHT RTS indication 915 (e.g., using TA from IEEE 802.11ac and/or TA 930A or 930B.) As a convenience and not a limitation, FIGS. 11A and 11B, may be described with elements of FIG. 1A, 1B, 2-5, 6A, 6B, 6C, 7, 8, 9, or 10. TA from IEEE 802.11ac signals with individual/group bit 955, whether scramble seed signals bandwidth information as shown in scrambler seed format 1120 are utilized.

Scrambler seed 1100 can be included in preamble 905 of FIG. 9 and preamble 1005 of FIG. 10. Stations utilize EHT RTS indication 915 to detect RTS and CTS frames that can support EHT medium reservation. When CTS station 120 can indicate the reserved bandwidth with an IEEE 802.11 CTS frame, then the CTS frame should use scrambler seed format 1120, as shown in the first row of Table 1.

Figure 11B:
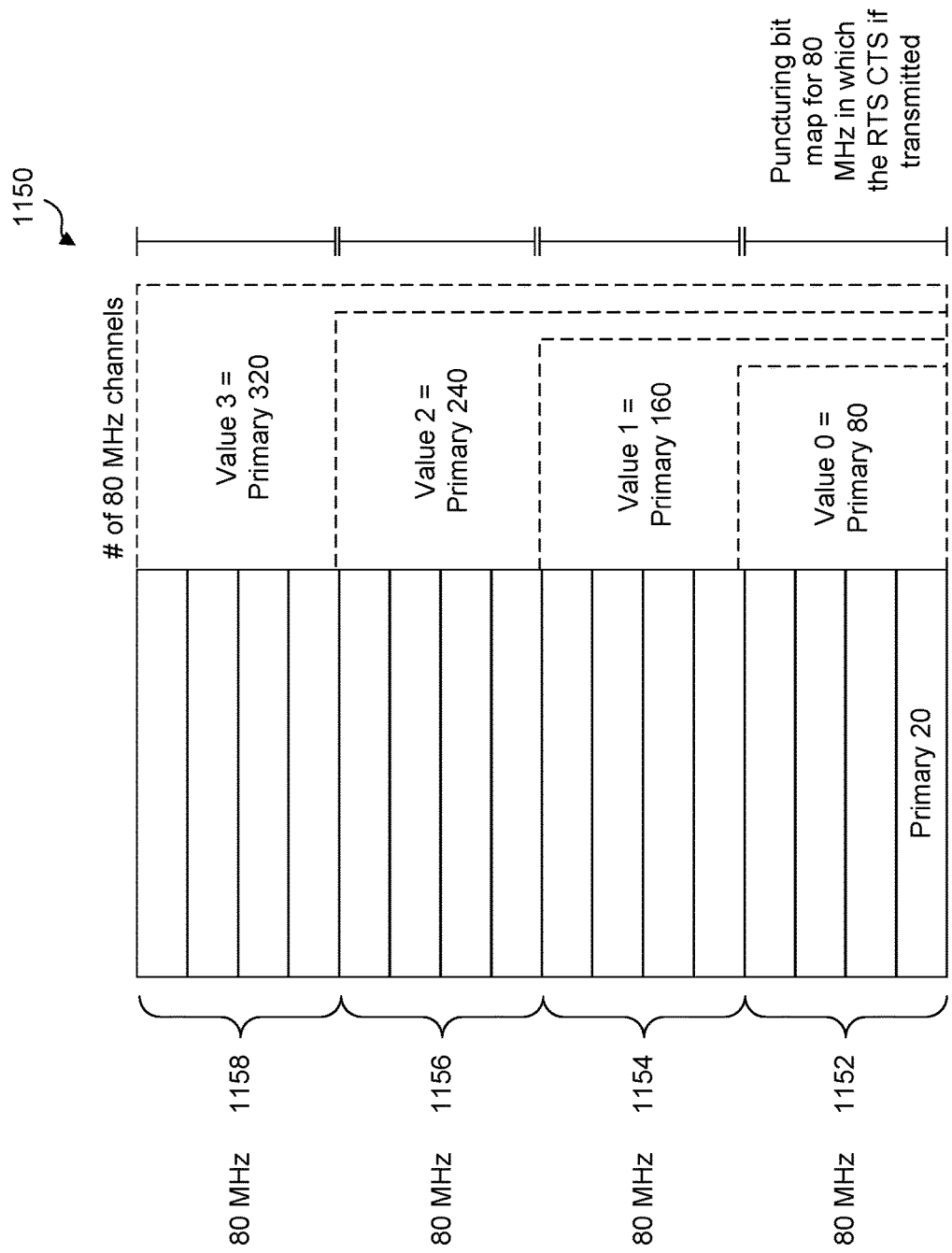
FIG. 11B illustrates an example of a puncturing bit map for corresponding to RTS and CTS frames for EHT medium reservation, according to some embodiments of the disclosure.

Scrambler seed format 1140 can be used to carry additional information for either RTS or CTS frames. For an RTS frame, RTS station 110 can set primary required 1142 to '0' if the CTS station can transmit CTS frames without reserving the primary channel. For a CTS frame, CTS station 120 can set primary required 1142 to '0' if a CTS frame is not transmitted on the primary channel. The two bits, # of 80 MHz 80/160/240/320 1144 indicates the EHT BW, whether the PPDU preamble is transmitted in multiples of 80 MHz channels within primary 80, 160, 240, or 320 MHz. For example, for primary 240 MHz, # of 80 MHz 80/160/240/320 1144 value=2 as shown in FIG. 11B. Each RTS and CTS frame is identical for each 80 MHz band. Transmitted 80 MHz Puncturing bitmap 1148 indicates which channels are punctured for each 80 MHz band (e.g., RTS frames and CTS frames transmitted in the primary 80 MHz indicates puncturing for these channels. FIG. 11B illustrates puncturing bit map 1150 for corresponding to RTS and CTS frames for EHT medium reservation, according to some embodiments of the disclosure. Different 80 MHz bands are identified accordingly as 1152, 1154, 1156, and 1158.

CTS station 120 that receives RTS frames can receive one RTS frame per 80 MHz channel. RTS station 110 that receives CTS frames can receive one CTS frame per 80 MHz channel. For an EHT BW of 240 MHz, CTS station 120 can receive three different RTS frames, where each RTS frame identifies using bits B3-B6, a puncturing bit map of the corresponding 80 MHz channels: i) the first RTS frame includes a first scrambler seed format 1140 that corresponds to 80 MHz 1152; ii) the second RTS frame includes a second scrambler seed format 1140 that corresponds to the 80 MHz 1154; and iii) the third RTS frame includes a third scrambler seed format 1140 that corresponds to 80 MHz 1156. A similar transmission occurs for CTS frames as well.

Scrambler seed format 1160 can be used to carry additional information for either RTS or CTS frames. Punctured 1162 indicates the size of the puncturing hole: '0'—no puncturing; '1'—20 MHz puncturing; '2'—40 MHz puncturing; and '3'—80 MHz puncturing. PPDU preamble (e.g., preamble 905 of example 900 or preamble 1005 of example 1000) may have different values every 80 MHz bandwidths, e.g., each 80 MHz of the transmission bandwidth may carry different values in scrambler seed format 1160 of preamble 905 or 1005. The RTS station 110 uses CCA to consider which channels are punctured for each 80 MHz BW separately. When RTS station 110 or CTS station 120 receives scrambler seed format 1160, RTS station 110 and/or CTS station 120 respectively uses CCA to determine the energy in each of the 20 MHz channel. The receiver uses the energy to determine the 20 MHz channel(s) in which the preamble can be received. The receiver should receive at least one PPDU preamble (e.g., preamble 905 or preamble 1005) in each 80 MHz of the EHT transmission BW. The CTS station 120 uses the received scrambler seed format 1160 of the RTS frames corresponding to each 80 MHz of the RTS EHT transmission BW to determine to which channels the RTS frame was transmitted. CTS station 120 may respond to RTS frames and transmit CTS frames containing a different scrambler seed format 1160 for each 80 MHz BW. When RTS station 110 receives such CTS frames, RTS station 110 compares the detected energy with the value of punctured 1162 to verify the channels in which the preamble of the CTS frames are transmitted and uses scrambler seed format 1160 of the CTS frame to determine the respective reserved and punctured channels in each of the 80 MHz channels.

For an RTS frame, RTS station 110 can set primary required 1162 to '0' if the CTS station can transmit CTS frames without reserving the primary channel, and '1' if the primary channel needs to be reserved and used for transmitting a CTS frame. For a CTS frame, CTS station 120 can set primary required 1162 to '0' if a CTS frame is not transmitted on the primary channel, or '1' to indicate that a CTS frame is transmitted on the primary channel. Dyn. BW 1166 indicates whether a CTS frame can be transmitted to any subset of the BW in which RTS frames were transmitted. BW 20/40/80/160/240/320 1168 indicates an EHT transmission BW for the frame that carried the information as shown below in Table 4.

TABLE 4

BW Field Encoding

| Bit Values | Bandwidth (BW) |
|---|---|
| 0 | 20 |
| 1 | 40 |
| 2 | 80 |
| 3 | 160/80 + 80 |
| 4 | 240 |
| 5 | 320 |
| 6-7 | Reserved |

BW 80 MHz 80/160/240/320 1184 indicates the EHT BW, whether the PPDU preamble is transmitted in multiples of 80 MHz channels within primary 80, 160, 240, or 320 MHz. For example, for primary 240 MHz, # of 80 MHz 80/160/240/320 1144 value=2 as shown in FIG. 11B.

Scrambler seed format 1180 can be used to carry additional information for either RTS or CTS frames. Reservation configuration #1182 indicates the configuration for the specific BW. For simple reservations, scrambler seed format 1120 (e.g., IEEE 802.11ac scrambler seed format) can be used (see Table 2 above.) Each reservation configuration #1182 value signals at least the following: i) the EHT BW and the channels in which the RTS is transmitted; ii) the allowed responses in which channels the CTS frame(s) may be transmitted as a response and/or the preference order of the allowed reservations; and iii) the listened secondary channels in which RTS station 110 may receive CTS. The RTS and/or CTS frame configuration settings may be specified in 802.11be or RTS station 110 and/or CTS station 120 may configure the settings. For example, reservation #1182 can be a type of CTS response mode as described in FIG. 2. For example, reservation configuration #values 0-16 may be specified for each BW. In some embodiments, RTS station 110 specifies the configurations that the stations use for their link in during association and/or in the RTS or CTS reservation configuration #1182.

In some embodiments, the bit B3 of scrambler seed 1100 may be used to signal the BW reservation. In this case, the reservation may use 3 bits or 4 bits to signal BW or punctured BW. If 3 bits are used, bit B4 may signal whether BW allocation is static or dynamic. For static BW reservation the CTS station 120 may send CTS only if CTS station 120 can reserve all resources in which the RTS was transmitted. If the Static/Dynamic bit (e.g., bit B4=0) is not present, the reservation is considered to be dynamic, (e.g., CTS station 120 tries to maximize the reserved BW, but CTS station 120 may reserve smaller BW than RTS station 110 requested.) As an example the BW usage of 3 bits can be applied as shown in Table 4.

In some embodiments, the scrambler bits of the RTS and/or CTS frames in primary channel 20 MHz (P20) and secondary channel 20 MHz (S20) channels may have different values. This 40 MHz wide RTS pattern is repeated throughout the whole BW of the frame. The scrambler bits B3-B6 are used in both P20 and S20 RTS and/or CTS frame can signal all together 8 bits information.

Figure 17:
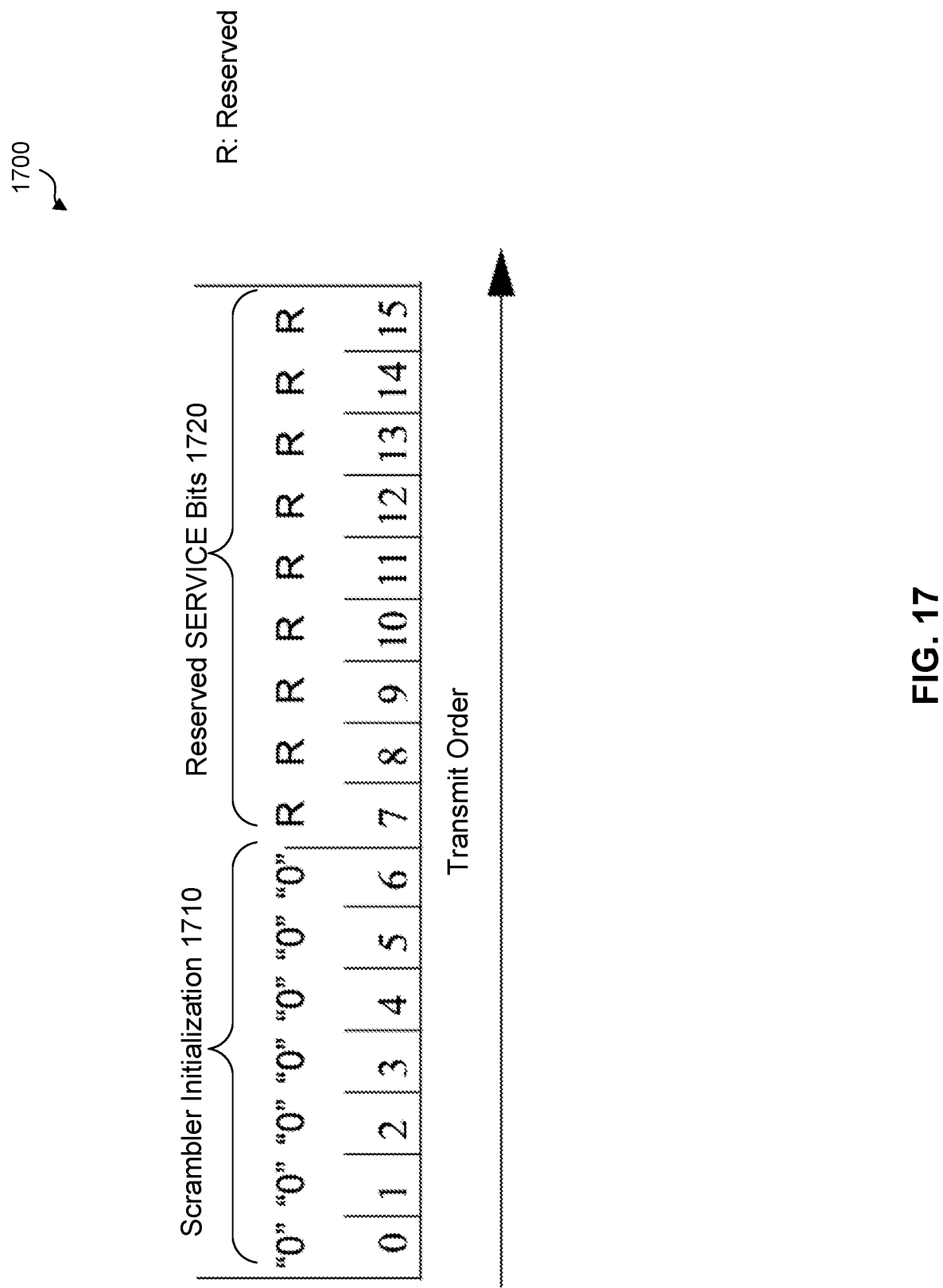
FIG. 17 illustrates an example of a service field bit assignment, according to some embodiments of the disclosure.

FIG. 17 illustrates example 1700 of a service field bit assignment, according to some embodiments of the disclosure. Example 1700 can be Service 1035 of FIG. 10. Example 1700 can include scrambler initialization 1710 that includes 7 bits. Examples of those 7 bits include the scrambler seed examples shown in FIG. 11A. Example 1700 also includes Reserved Service Bits 1720. Any of the bits of the two octets of example 1700 can be used to convey similar BW information. For example, Reserved Service Bits 1720 (9 bits available) can be used to signal the BW reservation. Example 1700 bits can be set to 0 in RTS frames, but some earlier proprietary solutions used these bits for signaling. In some embodiments (e.g., 802.11be case), the RTS frame may be used after association and RTS signaling setup. Thus, these bits can be used without risk of interoperability issues. In some embodiments, the Scrambler Initialization 1710 bits can be used together with Reserved Service bits 1720 to signal the BW configuration.

In some embodiments, the signaled BW allocation may not be able to reserve all possible BW and puncturing combinations. The BW signaling should, however, be able to signal at least the following reservations:
a. The basic BWs without puncturing (e.g., 20, 40, 80, 160, 240, 320 MHz reservations.)
b. Punctured BWs should cover small BW configurations, but may skip some punctured configurations for large BWs. Large BW are less likely to be available and operation in large BWs can be complicated. The reserving STAs can use the smaller BW configurations if the smaller BW is available.
c. Some embodiments include a reserving a BW with one punctured BW. Some embodiments include reserving a BW comprising two or more punctured holes.

FIG. 11C illustrates example 1185 of signaling combinations for corresponding to RTS and CTS frames for EHT medium reservation, according to some embodiments of the disclosure. The BW signaling can be implemented with multiple principles. In some examples, the BWs may be listed and each BW entry is numbered by a value that is signaled in the Scrambler Initialization 1710 bits or Reserved Service bits 1720 of example 1700. In some embodiments a configuration table of bit values can indicate a combination of a bandwidth and a corresponding puncturing pattern. The receiver and transmitter may exchange the configuration table or be provisioned with the configuration table before BW reservations are exchanged. Example 1185 illustrates example bit values for BW and puncturing patterns up to 320 MHz BW. In example 1185, 14 bit values are used to signal the reserved BW and corresponding puncturing pattern. For example, bit value=2 indicates a bandwidth request of 80 MHz in which the S20 is punctured. The bit value=3 indicates a bandwidth request of 80 MHz in which the S40-1 (e.g., lower) band is punctured. The reservation model may be generalized to more combinations of reserved BWs and corresponding puncture patterns, especially in light of the bit combinations available with example 1700.

FIG. 11D illustrates example 1190 of puncturing configurations corresponding to RTS and CTS frames, according to some embodiments of the disclosure. For instance, FIG. 11D illustrates the number of puncturing configurations that are needed to reserve the most configurations for 320 MHz BW. FIG. 11D lists altogether 48 cases (e.g., summing the last column.) For example, for a bandwidth reservation of 80 MHz a potential of 4 scenarios are possible: no puncturing; or a 20 MHz puncturing in either the S20, S40-1, or the S40-2 band. When reserving for a 160 MHz BW, puncturing is possible for a 20 MHz or a 40 MHz band as shown in example 1190 leading to a total of 11 possible configurations. For 240 MHz and 320 MHz BW reservations, 40 MHz puncturing BW options as well as additional puncturing 20 MHz BWs. To enable these reservations, there should be altogether 6 bits (64 values) to use for the BW reservations (e.g., to accommodate the 48 cases.)

In other embodiment for the BW signaling, some bits may define the BW size and other bits may be dependent bits that configure the puncturing band within the BW. In some embodiments, the reservation BW is identified by a few bits as shown in FIG. 11E. In addition, the signaling of the BW puncturing can utilize different bits (not shown.)

FIG. 11E illustrates example 1195 of bit values corresponding to RTS and CTS frames for EHT medium reservation, according to some embodiments of the disclosure. For instance, there may be bits B3, B5 and B6 of scrambler seed 1100 that communicate the BW of the reservation as shown in example 1195, and bits in the Reserved Service bits 1720 of example 1700 may configure the puncturing for the BW (not shown). The BW puncturing may be an optional capability, if supported by the RTS transmitter and CTS transmitter. The BW puncturing may be signaled with 4 bits, for example. Some of the larger BWs may have two BW indications to allow the bandwidths have 32 puncturing options. As shown in FIG. 11D, 160 MHz may use 11 puncturing patterns, 240 MHz may use 14 puncturing options (e.g., 8 cases and 6 alternatives from the second to last row), and 320 MHz may use 17 puncturing options (e.g., 11 cases and 6 alternatives from the last row.) The puncturing options are shown as a letter P in a specific channel. In each punctured option one hole (e.g., one channel that has P) is punctured. The number of such options is shown in the rightmost column. The primary channel is not punctured in any BW.

FIG. 11D may show example signaling for the bandwidth. Different bits can be used for signaled puncturing in a specific BW. A puncturing configuration depends in this case on the BW indication, (e.g., as shown in the FIG. 11E different bandwidths may have different sizes of the punctured channels and different number of puncturing options.) For example, there may be two sets of configuration signaling for the 320 MHz and 240 MHz bandwidths to reduce the number of bits required to signal the puncturing configuration. The puncturing may signalled so that puncturing bit value 0 indicates that no puncturing occurs in the BW. Value 1 may signal the first P of the BW in the read order and the puncturing bits value is increased until all configurations are signaled. Thus, to signal all 17 alternatives of the 320 MHz puncturing would utilize 5 bits, or if 320 MHz BW can be signaled with 2 values, then 4 bits for puncturing are used.

Figure 12:
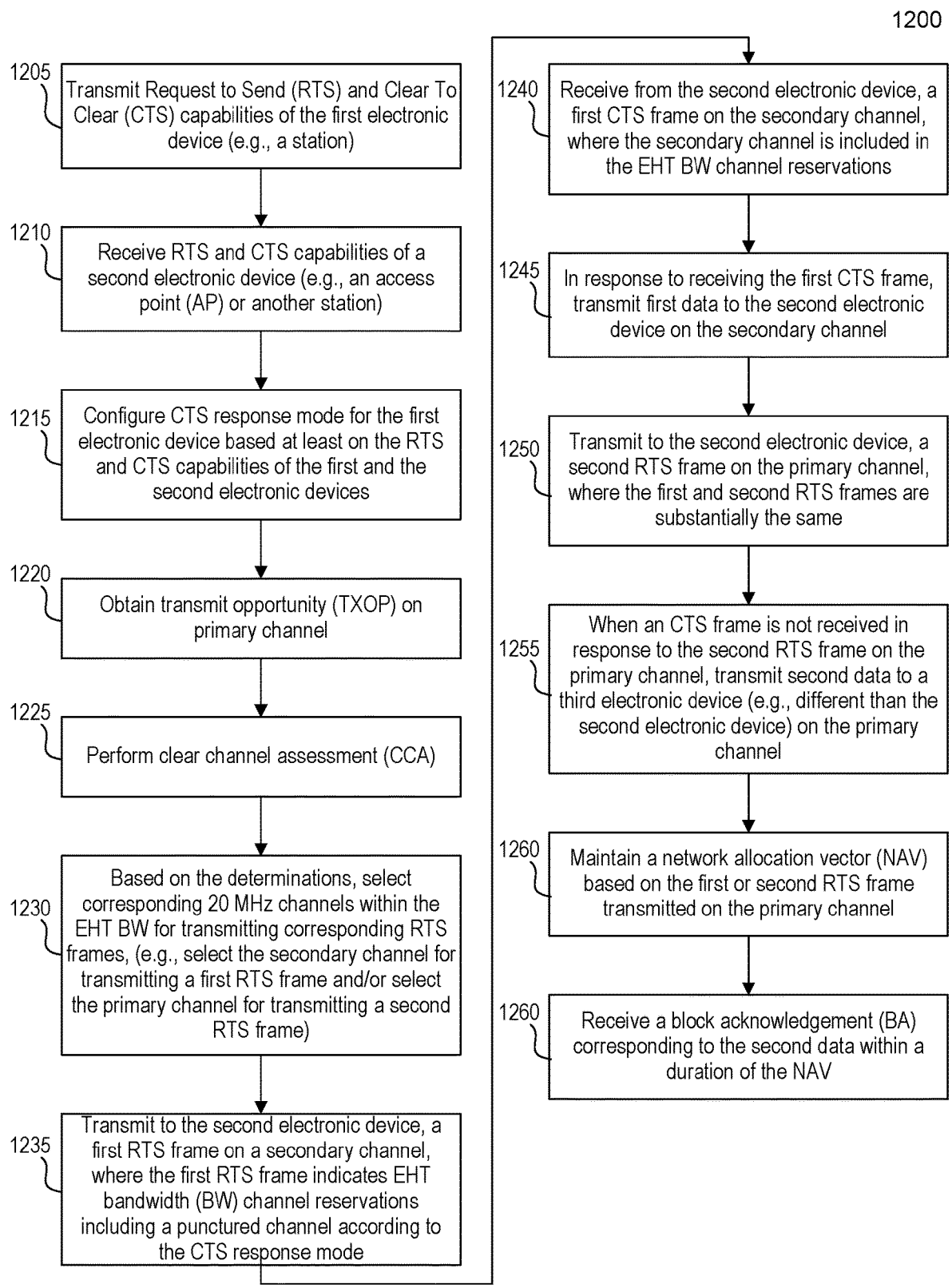
FIG. 12 illustrates a method for an RTS station for EHT medium reservation, according to some embodiments of the disclosure.

FIG. 12 illustrates a method 1200 for an RTS station for EHT medium reservation, according to some embodiments of the disclosure. As a convenience and not a limitation, FIG. 12 may be described with elements of FIG. 1A, 1B, 2-5, 6A, 6B, 6C, or 7-11. For example, RTS station can be RTS station 110 or system 300.

At 1205, RTS station 110 transmits RTS and CTS capabilities to a second electronic device. For example, RTS station 110 can transmit RTS and/or CTS capabilities of RTS station 110 to CTS station 120.

At 1210, RTS station 110 receives RTS and CTS capabilities of a second electronic device (e.g., an access point (AP) or another station). For example, the second electronic device can be a CTS station such as CTS station 120.

At 1215, RTS station 110 configures the CTS response mode for RTS station 110 based at least on the RTS and CTS capabilities of the first and the second electronic devices (e.g., based on RTS station 110 and CTS station 120's RTS and CTS capabilities.) The CTS response mode can include the various RTS and CTS rules including but not limited to the use and interpretation of fields and corresponding values including but not limited to the examples illustrated in FIGS. 4, 5, 6A, 6B, 6C, and 7-11.

At 1220, RTS station 110 obtains one or more transmit opportunities (TXOP) on the primary channel.

At 1225, RTS station 110 performs CCA on a primary channel over a PIFS using a 20 MHz CCA threshold corresponding, and/or perform CCA across an EHT BW over the PIFS using an EHT BW CCA threshold, where the EHT BW comprises a multiple of 80 MHz channels, and where the EHT BW CCA threshold is different than the 20 MHz CCA threshold. RTS station 110 determines based at least on the performing that the primary channel is idle and/or that one or more channels corresponding to the EHT BW is idle.

At 1230, based on the determinations, RTS station 110 selects corresponding idle 20 MHz channels within the EHT BW for transmitting corresponding RTS frames, (e.g., select the secondary channel for transmitting a first RTS frame and/or select the primary channel for transmitting a second RTS frame.)

At 1235, RTS station 110 transmits to the second electronic device, a first RTS frame on a secondary channel, where the first RTS frame indicates EHT BW channel reservations that can include one or more punctured channels according to the CTS response mode. For example, the EHT BW channel reservations can be identified: i) in TA 930A or TA 930B of FIG. 9 alone or in conjunction with Table 2. Scrambler Seed Bits for RTS Channel Reservation Request; or ii) in a scrambler seed format such as 1140, 1160, or 1180 of FIG. 11. The first RTS frame can include an EHT RTS Indication 915 of FIG. 9 to indicate that the first RTS frame is capable of EHT medium reservation.

At 1240, RTS station 110 receives from the second electronic device, a first CTS frame on the secondary channel, where the secondary channel is included in the BW channel reservations. For example, the first CTS frame can be CTS frame 1030 or CTS frame 1050 of FIG. 10 that can include Reserved Channels 1040 field to signal the channels to which the CTS frame are transmitted.

At 1245, in response to receiving the first CTS frame, RTS station 110 transmits first data to the second electronic device on the secondary channel.

At 1250, RTS station 110 transmits to the second electronic device, a second RTS frame on the primary channel, where the first and second RTS frames are substantially the same. In some embodiments the first and second RTS frames are transmitted at substantially the same time.

At 1255, when an CTS frame is not received in response to the second RTS frame on the primary channel, RTS station 110 transmits second data to a third electronic device (e.g., different than the second electronic device) on the primary channel. Even though CTS station 120 found the primary channel to be busy and could not send a CTS frame in response to the second RTS frame, RTS station 110 can utilize the primary channel to transmit data to a different station such as station 150.

At 1260, RTS station 110 maintains a network allocation vector (NAV) based on the second RTS frame transmitted on the primary channel.

At 1265, RTS station 110 receives a block acknowledgement (BA) corresponding to the second data within a duration of the NAV.

Figure 13:
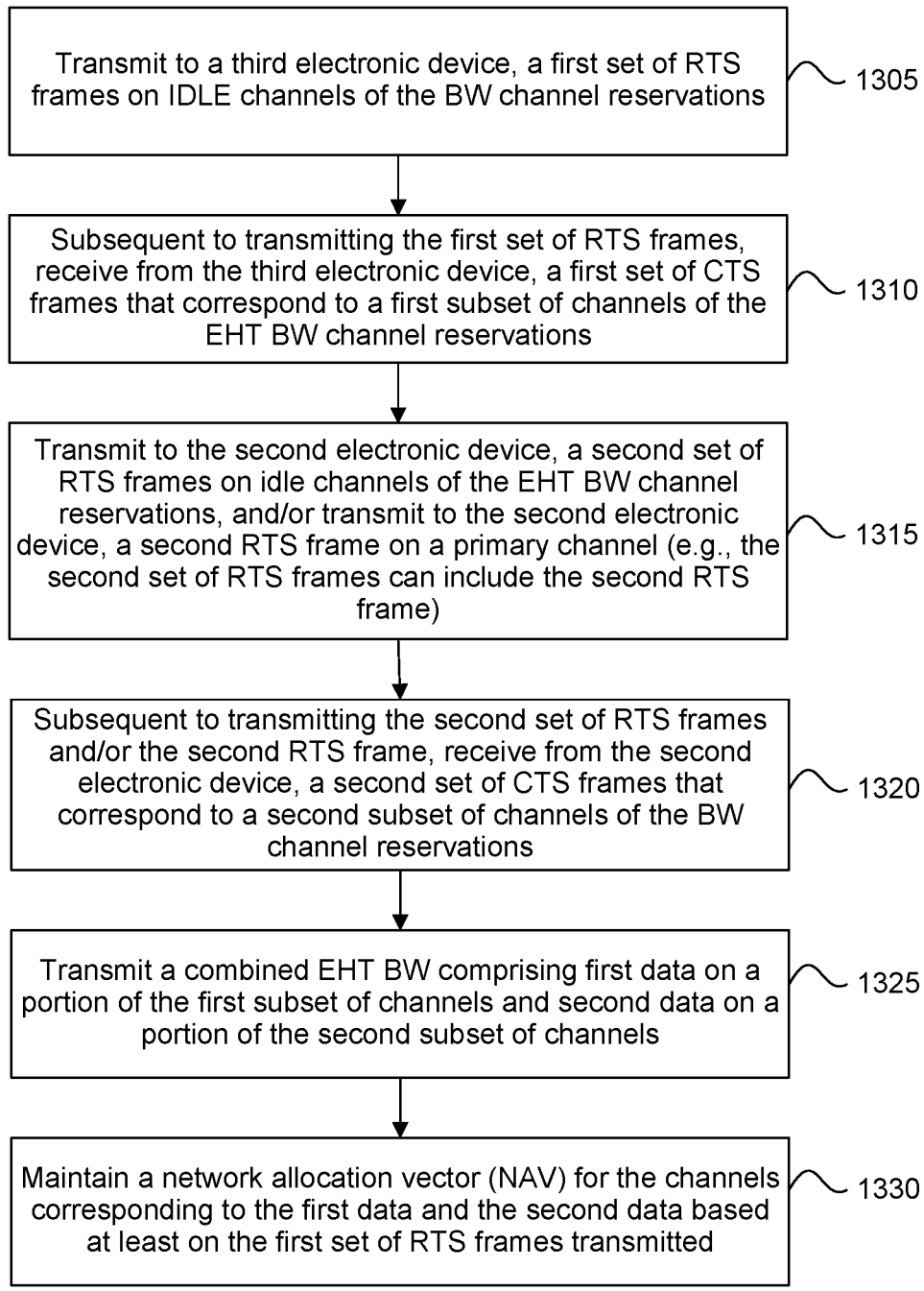
FIG. 13 illustrates a method for an RTS station for a dual RTS and CTS reservation scheme for EHT medium reservation, according to some embodiments of the disclosure.

FIG. 13 illustrates a method for an RTS station for a dual RTS and CTS reservation scheme for EHT medium reservation, according to some embodiments of the disclosure. As a convenience and not a limitation, FIG. 13 may be described with elements of FIG. 1A, 1B, 2-5, 6A, 6B, 6C, or 7-12. For example, RTS station can be RTS station 110 or system 300. In this example, RTS station 110 may want to reserve 120 MHz EHT BW (e.g., six 20 MHz channels.) If RTS station 110 transmits RTS frames to a first CTS station but does not receive enough CTS frames from the first CTS station, then RTS station 110 can transmit RTS frames to a second CTS station to try to obtain enough CTS frames to send a signal that satisfies the 120 MHz EHT BW that includes data transmitted to the first CTS station and the second CTS station.

At 1305, RTS station 110 transmits to a third electronic device (e.g., CTS station 150), a first set of RTS frames on idle channels of the EHT BW channel reservations.

At 1310, subsequent to transmitting the first set of RTS frames, RTS station 110 receives from the third electronic device, a first set of CTS frames that correspond to a first subset of channels of the EHT BW channel reservations. For example, RTS station 110 may receive three CTS frames from CTS station 150.

At 1315, RTS station 110 transmits to a second electronic device (e.g., CTS station 120), a second set of RTS frames on idle channels of the EHT BW channel reservations, and/or transmit to the second electronic device, a second RTS frame on a primary channel (e.g., the second set of RTS frames can include the second RTS frame.)

At 1320, subsequent to transmitting the second set of RTS frames and/or the second RTS frame, RTS station 110 receives from the second electronic device, a second set of CTS frames that correspond to a second subset of channels of the EHT BW channel reservations. For example, the second set of CTS frames may include 4 CTS frames.)

At 1325, RTS station 110 transmits a combined EHT BW comprising first data on a portion of the first subset of channels and second data on a portion of the second subset of channels. For example, RTS station 110 can transmit data in 3 channels corresponding to CTS station 150's CTS frames and transmit data in 3 channels corresponding to some of the CTS frames of CTS station 120. Other combinations are possible to make up the 120 MHz EHT BW.

At 1330, RTS station 110 maintains a network allocation vector (NAV) for the channels corresponding to the first data and the second data based at least on the first set of RTS frames transmitted.

Figure 14:
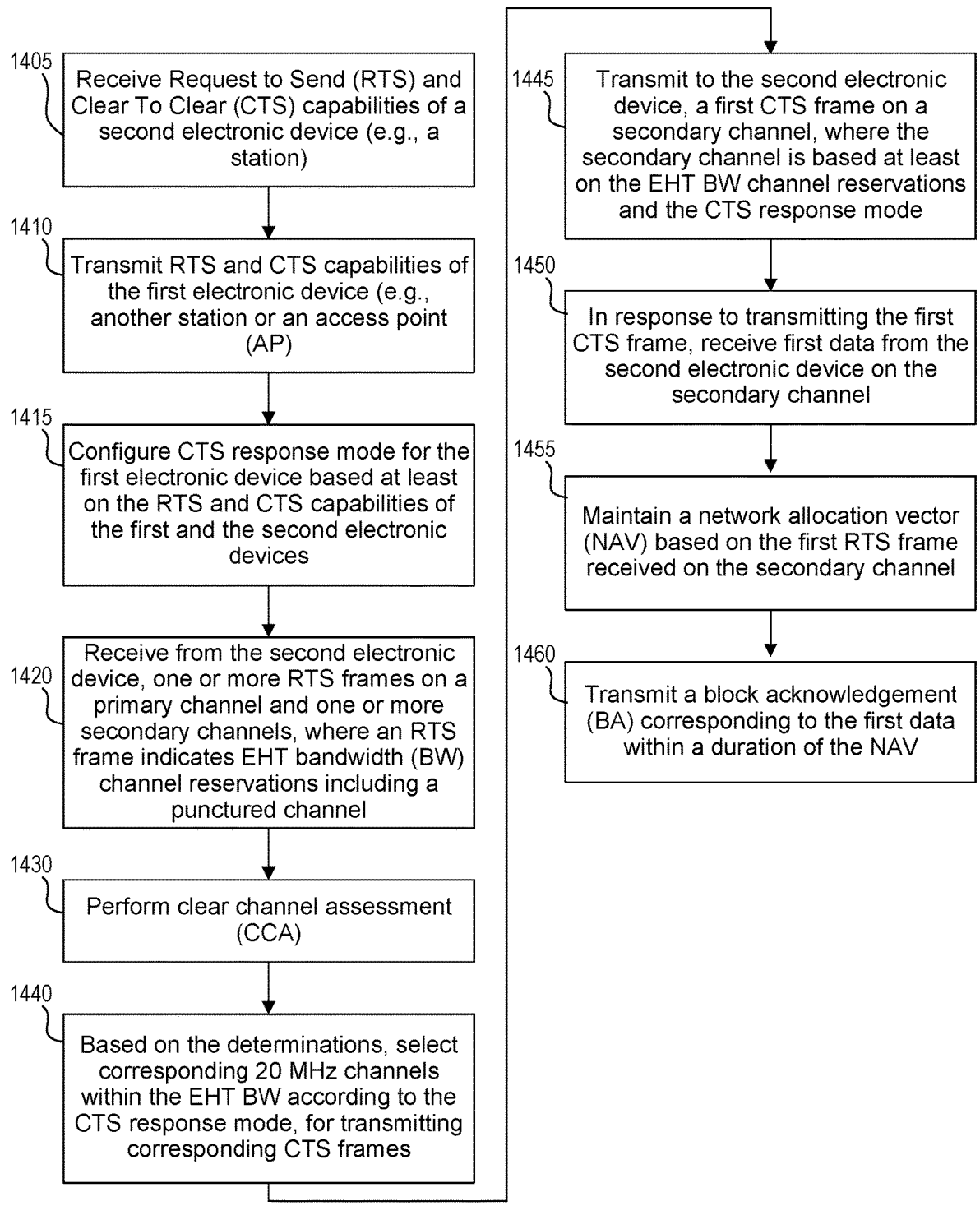
FIG. 14 illustrates a method for a CTS station for EHT medium reservation, according to some embodiments of the disclosure.

FIG. 14 illustrates a method for a CTS station for EHT medium reservation, according to some embodiments of the disclosure. As a convenience and not a limitation, FIG. 14 may be described with elements of FIG. 1A, 1B, 2-5, 6A, 6B, 6C, or 7-13. For example, CTS station can be CTS station 120 or system 300.

At 1405, CTS station 120 receives RTS and CTS capabilities of a second electronic device (e.g., a station.)

At 1410, CTS station 120 transmits RTS and CTS capabilities of the first electronic device (e.g., another station or an access point (AP).)

At 1415, CTS station 120 configures a CTS response mode for the first electronic device based at least on the RTS and CTS capabilities of the first and the second electronic devices.

At 1420, CTS station 120 receives from the second electronic device, one or more RTS frames on a primary channel and one or more secondary channels, where an RTS frame indicates EHT BW channel reservations that can include a punctured channel.

At 1430, CTS station 120 performs clear channel assessment (CCA) on the primary and secondary channels over a Short Interframe Space (SIFS) using CCA thresholds corresponding to 20 MHz channels. In some embodiments, CTS station 120 performs CCA across the EHT BW over the SIFS using a single EHT CCA threshold, where the EHT CCA threshold is different than the CCA thresholds corresponding to the 20 MHz channels. CTS station 120 determines based at least on the performing, that i) the primary channel is BUSY, (so an CTS frame is not transmitted on the primary channel) and/or ii) that portions of the EHT BW is IDLE.

At 1440, based on the determinations, CTS station 120 selects corresponding 20 MHz channels within the EHT BW according to the CTS response mode, for transmitting corresponding CTS frames.

At 1445, CTS station 120 transmits to the second electronic device, a first CTS frame on the secondary channel, where the secondary channel is based at least on the EHT BW channel reservations and the CTS response mode. Thus, even when CTS station 120 determines that the primary channel is not available, CTS station 120 can transmit CTS frames in the available idle channels to RTS station 110.

At 1450, in response to transmitting the first CTS frame, CTS station 120 receives first data from the second electronic device on the secondary channel.

At 1455, CTS station 120 maintains a network allocation vector (NAV) based on the first RTS frame received on the secondary channel At 1460, CTS station 120 transmits a block acknowledgement (BA) corresponding to the first data within a duration of the NAV.

Figure 15:
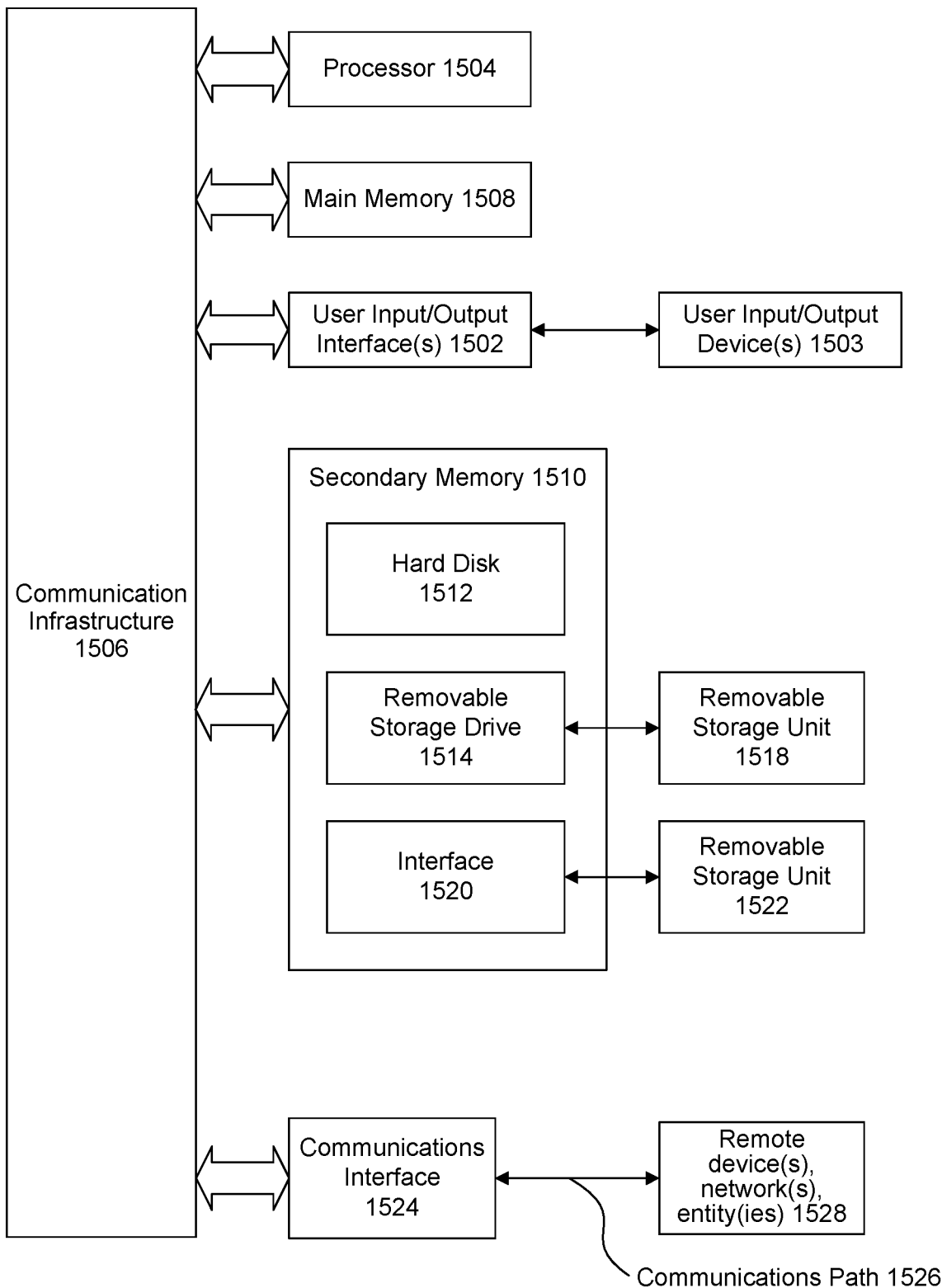
FIG. 15 is an example computer system for implementing some embodiments or portion(s) thereof.

Various embodiments can be implemented, for example, using one or more computer systems, such as computer system 1500 shown in FIG. 15. Computer system 1500 can be any well-known computer capable of performing the functions described herein. For example, and without limitation, computer system 1500 can be any electronic devices such as tablets, laptops, desktops as described with regard to stations or APs in FIG. 1A and/or other apparatuses and/or components shown in the figures. The laptops and desktops or other wireless devices may include the functions as shown in system 300 of FIG. 3 and/or some or all of method 1200 of FIG. 12, method 1300 of FIG. 13, and method 1400 of FIG. 14. For example, computer system 1500 can be used in wireless devices to exchange communications to enable EHT medium reservation.

Computer system 1500 includes one or more processors (also called central processing units, or CPUs), such as a processor 1504. Processor 1504 is connected to a communication infrastructure 1506 that can be a bus. Computer system 1500 also includes user input/output device(s) 1503, such as monitors, keyboards, pointing devices, etc., that communicate with communication infrastructure 1506 through user input/output interface(s) 1502. Computer system 1500 also includes a main or primary memory 1508, such as random access memory (RAM). Main memory 1508 may include one or more levels of cache. Main memory 1508 has stored therein control logic (e.g., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to some embodiments, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1500, main memory 1508, secondary memory 1510 and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 15. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A first electronic device, comprising:
a transceiver configured to transmit and receive wireless transmissions;
a processor, coupled to the transceiver, configured to:
transmit via the transceiver, Request to Send (RTS) and Clear To Send (CTS) capabilities of the first electronic device;
receive via the transceiver, RTS and CTS capabilities of a second electronic device;
configure a CTS response mode for the first electronic device based at least on the RTS and CTS capabilities of the first and the second electronic devices;
transmit via the transceiver, to the second electronic device, a first RTS frame on a secondary channel, wherein the first RTS frame indicates extremely high throughput (EHT) bandwidth (BW) channel reservations that include a punctured channel according to the CTS response mode; and
receive via the transceiver, from the second electronic device, a first CTS frame on the secondary channel, wherein the secondary channel is included in the EHT BW channel reservations.

2. The first electronic device of claim 1, wherein the processor is further configured to:
in response to receiving the first CTS frame, transmit via the transceiver, first data to the second electronic device on the secondary channel;
transmit via the transceiver, to the second electronic device, a second RTS frame on a primary channel, wherein the first and the second RTS frames are substantially the same; and
based on a CTS frame not being received in response to the transmission of the second RTS frame on the primary channel, transmit via the transceiver, second data to a third electronic device on the primary channel.

3. The first electronic device of claim 2, wherein the processor is further configured to:

first perform clear channel assessment (CCA) on the primary channel, over a Point Coordination Function (PCF) Interframe Space (PIFS) using a 20 MHz CCA threshold;

determine based at least on the first performance, that the primary channel is idle; and select the primary channel for transmitting the second RTS frame.

4. The first electronic device of claim 3, wherein the processor is further configured to:

maintain a network allocation vector (NAV) based on the transmission of the second RTS frame on the primary channel; and receive a block acknowledgement (BA) corresponding to the second data within a duration of the NAV.

5. The first electronic device of claim 3, wherein the processor is further configured to:

second perform CCA across channels corresponding to the EHT BW channel reservations over the PIFS using an EHT BW CCA threshold, wherein the EHT BW channel reservations comprise a multiple of 80 MHz channels, and wherein the EHT BW CCA threshold is different than the 20 MHz CCA threshold;

determine based at least on the second performance, that one or more channels corresponding to the EHT BW channel reservations are idle; and select the one or more idle channels for transmitting corresponding RTS frames.

6. The first electronic device of claim 1, wherein the processor is further configured to:

transmit via the transceiver, to the second electronic device, a second RTS frame on a primary channel;

subsequent to transmitting the second RTS frame, receive via the transceiver, from the second electronic device, a first set of CTS frames that correspond to a first subset of channels of the EHT BW channel reservations;

transmit via the transceiver, to a third electronic device, a first set of RTS frames on idle channels of the EHT BW channel reservations;

subsequent to transmitting the first set of RTS frames, receive via the transceiver, from the third electronic device, a second set of CTS frames that correspond to a second subset of channels of the EHT BW channel reservations; and transmit via the transceiver, a combined BW comprising first data on a portion of the first subset of channels and second data on a portion of the second subset of channels.

7. The first electronic device of claim 6, wherein the processor is further configured to:

maintain a network allocation vector (NAV) for channels corresponding to the first data and the second data based at least on the transmission of the first set of RTS frames.

8. The first electronic device of claim 6, wherein the processor is further configured to:

transmit via the transceiver, to the second electronic device, a second set of RTS frames on idle channels of the EHT BW channel reservations, wherein the second set of RTS frames includes the second RTS frame.

9. A first electronic device, comprising:

a transceiver configured to transmit and receive wireless transmissions;

a processor, coupled to the transceiver, configured to:

receive via the transceiver, Request to Send (RTS) and Clear To Send (CTS) capabilities of a second electronic device;

transmit via the transceiver, RTS and CTS capabilities of the first electronic device;

configure a CTS response mode for the first electronic device based at least on the RTS and CTS capabilities of the first and the second electronic devices;

receive via the transceiver, from the second electronic device, a first RTS frame on a secondary channel, wherein the first RTS frame indicates extremely high throughput (EHT) bandwidth (BW) channel reservations that includes a punctured channel; and transmit via the transceiver, to the second electronic device, a first CTS frame on the secondary channel, wherein the secondary channel is based at least on the EHT BW channel reservations and the CTS response mode.

10. The first electronic device of claim 9, wherein the processor is further configured to:

receive via the transceiver, from the second electronic device, a second RTS frame on a primary channel, wherein the first and the second RTS frames are substantially the same;

determine that the primary channel is busy; and in response to transmitting the first CTS frame, receive via the transceiver, first data from the second electronic device on the secondary channel.

11. The first electronic device of claim 10, wherein the processor is further configured to:

first perform clear channel assessment (CCA) on the primary channel comprising a 20 MHz channel, over a Short Interframe Space (SIFS) using a 20 MHz CCA threshold; and determine based at least on the first performance, that the primary channel is busy, wherein a CTS frame is not transmitted on the primary channel.

12. The first electronic device of claim 11, wherein the processor is further configured to:

receive via the transceiver, from the second electronic device, multiple RTS frames across channels corresponding to EHT BW channel reservations, wherein the EHT BW channel reservations comprise a multiple of 80 MHz channels;

second perform CCA across the EHT BW channel reservations over the SIFS using an EHT BW CCA threshold, wherein the EHT BW EHT CCA threshold is different than the 20 MHz CCA threshold;

determine based at least on the second perform, that the channels corresponding to the EHT BW channel reservations are idle; and select corresponding idle 20 MHz channels within the EHT BW channel reservations according to the CTS response mode, for transmitting corresponding CTS frames.

13. The first electronic device of claim 10, wherein the processor is further configured to:

maintain a network allocation vector (NAV) based on the first RTS frame received on the secondary channel; and transmit a block acknowledgement (BA) corresponding to the first data within a duration of the NAV.

14. The first electronic device of claim 9, wherein the first CTS frame comprises: a receiver address (RA) that includes a first bit map of the EHT BW channel reservations, a second bit map that indicates the secondary channel over which the first CTS frame is transmitted, or CTS information.

15. The first electronic device of claim 14, wherein the CTS information comprises:

a network allocation vector (NAV) report on channels corresponding to the first bit map, or an estimation of signal-to-noise-plus-interference ratio (SINR) of the channels corresponding to the first bit map.

16. A method, comprising:

transmitting Request to Send (RTS) and Clear To Send (CTS) capabilities of a first electronic device;

receiving RTS and CTS capabilities of a second electronic device;

configuring a CTS response mode for the first electronic device based at least on the RTS and CTS capabilities of the first and the second electronic devices;

transmitting to the second electronic device, a first RTS frame on a secondary channel, wherein the first RTS frame indicates extremely high throughput (EHT) bandwidth (BW) channel reservations according to the CTS response mode; and receiving from the second electronic device, a first CTS frame on the secondary channel, wherein the secondary channel is included in the EHT BW channel reservations.

17. The method of claim 16, further comprising:

in response to receiving the first CTS frame, transmitting first data to the second electronic device on the secondary channel;

transmitting to the second electronic device, a second RTS frame on a primary channel, wherein the first and the second RTS frames are substantially the same; and based at least on a CTS frame not being received in response to transmission of the second RTS frame on the primary channel, transmitting second data to a third electronic device on the primary channel.

18. The method of claim 17, further comprising:

first performing clear channel assessment (CCA) on the primary channel comprising a 20 MHz channel, over a Point Coordination Function (PCF) Interframe Space (PIFS) using a 20 MHz CCA threshold;

determining based at least on the first performance that the primary channel is idle; and selecting the primary channel for transmitting the second RTS frame.

19. The method of claim 18, further comprising:

maintaining a network allocation vector (NAV) based on the transmission of the second RTS frame on the primary channel; and receiving a block acknowledgement (BA) corresponding to the second data within a duration of the NAV.

20. The method of claim 18, further comprising:

second performing CCA across channels corresponding to the EHT BW channel reservations over the PIFS using an EHT BW CCA threshold, wherein the EHT BW channel reservations comprise a multiple of 80 MHz channels, and wherein the EHT BW CCA threshold is different than the 20 MHz CCA threshold;

determining based at least on the second performance that one or more channels corresponding to the EHT BW channel reservations are idle; and selecting the one or more idle channels for transmitting corresponding RTS frames.

* * * * *